United States Patent
Oba et al.

(10) Patent No.: US 9,651,826 B2
(45) Date of Patent: May 16, 2017

(54) WAVELENGTH CONVERSION MEMBER, BACKLIGHT UNIT, AND LIQUID CRYSTAL DISPLAY DEVICE

(71) Applicant: FUJIFILM Corporation, Tokyo (JP)

(72) Inventors: Tatsuya Oba, Kanagawa (JP); Makoto Kamo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 100 days.

(21) Appl. No.: 14/714,733

(22) Filed: May 18, 2015

(65) Prior Publication Data

US 2015/0330603 A1    Nov. 19, 2015

(30) Foreign Application Priority Data

May 19, 2014  (JP) .................................. 2014-103859
Feb. 2, 2015   (JP) .................................. 2015-018846
May 13, 2015  (JP) .................................. 2015-098169

(51) Int. Cl.
  *C09K 19/00*   (2006.01)
  *G02F 1/1335*  (2006.01)
  (Continued)

(52) U.S. Cl.
  CPC ........ *G02F 1/133617* (2013.01); *C09K 19/14* (2013.01); *F21V 9/16* (2013.01);
  (Continued)

(58) Field of Classification Search
  CPC ............. Y10T 428/10; G02F 1/133617; G02F 2001/133614; F21V 9/16; G02B 6/005;
  (Continued)

(56) References Cited

U.S. PATENT DOCUMENTS

2007/0077480 A1    4/2007  Curello et al.

FOREIGN PATENT DOCUMENTS

JP    H02-269667 A    11/1990
JP    H06-256727 A     9/1994
(Continued)

OTHER PUBLICATIONS

Henkel, E-30CL Eepoxy Rresin Safety Data Sheet, May 20, 2015.*
(Continued)

*Primary Examiner* — Ruiyun Zhang
(74) *Attorney, Agent, or Firm* — Edwards Neils LLC; Jean C. Edwards, Esq.

(57) ABSTRACT

An aspect of the present invention relates to a wavelength conversion member, which comprises a wavelength conversion layer, wherein the wavelength conversion layer comprises at least one quantum dot which has a property of being excited with exciting light to emit fluorescence, and at least one oxygen permeability coefficient-reducing agent, an oxygen permeability coefficient per 1 mm thickness of the wavelength conversion layer is less than 150.0 $cm^3/m^2/day/atm$, and the oxygen permeability coefficient-reducing agent is a compound which exhibits an oxygen permeability coefficient-reducing capability of reducing the oxygen permeability coefficient per 1 mm thickness of the wavelength conversion layer by equal to or more than 30% per 10 parts by weight of the oxygen permeability coefficient-reducing agent relative to 100 parts by weight of the wavelength conversion layer except for the oxygen permeability coefficient-reducing agent.

19 Claims, 4 Drawing Sheets

(51) Int. Cl.
*F21V 9/16* (2006.01)
*H05B 33/20* (2006.01)
*C09K 19/14* (2006.01)
*C09K 19/12* (2006.01)

(52) U.S. Cl.
CPC ....... *H05B 33/20* (2013.01); *C09K 2019/122* (2013.01); *C09K 2019/123* (2013.01); *G02F 2001/133614* (2013.01); *Y10T 428/10* (2015.01)

(58) Field of Classification Search
CPC .. G02B 6/0025; G02B 6/0026; G02B 6/0073; G02B 6/0075; B82Y 20/00; C09K 11/703; C09K 11/025; B32B 2457/202; B32B 2551/00
USPC .......... 428/1.1; 349/69–71; 252/301.36, 500, 252/589; 362/606, 608, 614, 317, 84; 977/773, 774, 834
See application file for complete search history.

(56) References Cited

FOREIGN PATENT DOCUMENTS

| | | |
|---|---|---|
| JP | 2008-302983 A | 12/2008 |
| JP | 2009-512138 A | 3/2009 |
| JP | 2011-189238 A | 9/2011 |
| JP | 2013-544018 A | 12/2013 |
| JP | 2014508818 A | 4/2014 |
| WO | 2012/064562 A1 | 5/2012 |
| WO | 2012/085780 A9 | 6/2012 |
| WO | 2012/132236 A1 | 10/2012 |

OTHER PUBLICATIONS

Notification of Reasons for Refusal issued by the Japanese Patent Office on Dec. 6, 2016, in connection with related Japanese Patent Application No. 2015-098169.

* cited by examiner

WAVELENGTH CONVERSION MEMBER, BACKLIGHT UNIT, AND LIQUID CRYSTAL DISPLAY DEVICE

CROSS-REFERENCE TO RELATED APPLICATIONS

This application claims priority under 35 U.S.C. 119 to Japanese Patent Application No. 2014-103859 filed on May 19, 2014, Japanese Patent Application No. 2015-018846 filed on Feb. 2, 2015 and Japanese Patent Application No. 2015-98169 filed on May 13, 2015. Each of the above applications is hereby expressly incorporated by reference, in its entirety.

BACKGROUND OF THE INVENTION

Field of the Invention

The present invention relates to a wavelength conversion member, as well as a backlight unit and a liquid crystal display device including the wavelength conversion member.

Discussion of the Background

Use of flat panel display such as a liquid crystal display device (hereinafter, also referred to as "LCD") has been enlarged year by year as a space-saving image display device because of small power consumption. The liquid crystal display device is constituted of at least a backlight and a liquid crystal cell, and usually, further includes a polarizing plate on a backlight side, a polarizing plate on a viewing side.

In the flat panel display market, the enhancement of color reproduction is being developed as an improvement of the LCD performance. With regard to this point, in recent years, a Quantum Dot (QD, also referred to as quantum point) as a light emitting material has drawn many people's attention (see JP2013-544018A, which is expressly incorporated herein by reference in its entirety). For example, when exciting light enters a wavelength conversion member containing quantum dots from a backlight, the quantum dots are excited to emit fluorescence. By using quantum dots having different light emission characteristics, emission of red light, green light and blue light can be achieved to thereby embody white light. Since the fluorescence emitted by quantum dots has a small half width, the obtained white light has a high brightness and is excellent in color reproducibility. Due to the advancement of the three wavelength light source technique using such quantum dots, the range of color reproducibility is enlarged from 72% to 100% in terms of the present TV standard ratio (FHD (Full High Definition)), NTSC (National Television System Committee)).

SUMMARY OF THE INVENTION

When the quantum dot comes into contacts with oxygen, the quantum dot is degraded to lower light emission efficiency. It is considered that the reason is because the quantum dot causes photooxidation reaction by coming into contact with oxygen. Accordingly, in order to obtain a wavelength conversion member exhibiting excellent light emission efficiency, the degradation of the quantum dot by oxygen should be suppressed.

An aspect of the present invention provides for a wavelength conversion member which can exhibit excellent light emitting efficiency.

An aspect of the present invention relates to a wavelength conversion member, which comprises a wavelength conversion layer, wherein the wavelength conversion layer comprises at least one quantum dot which has a property of being excited with exciting light to emit fluorescence, and at least one oxygen permeability coefficient-reducing agent, an oxygen permeability coefficient per 1 mm thickness of the wavelength conversion layer is less than 150.0 $cm^3/m^2/day/atm$, and the oxygen permeability coefficient-reducing agent is a compound which exhibits an oxygen permeability coefficient-reducing capability of reducing the oxygen permeability coefficient per 1 mm thickness of the wavelength conversion layer by equal to or more than 30% per 10 parts by weight of the oxygen permeability coefficient-reducing agent relative to 100 parts by weight of the wavelength conversion layer except for the oxygen permeability coefficient-reducing agent.

In the following, the above wavelength conversion member will be further explained in detail. In the present invention and the description, the content of the oxygen permeability coefficient-reducing agent in the wavelength conversion layer is represented by a value in which the weight of the wavelength conversion layer except for the oxygen permeability coefficient-reducing agent is assumed to be 100 parts by weight. This value can be assumed to be the same as a value in which a total amount of a quantum dot-containing polymerizable composition, except for a solvent and the oxygen permeability coefficient-reducing agent, used for forming the wavelength conversion layer is assumed to be 100 parts by weight. Accordingly, a value calculated from the formulation of the quantum dot-containing polymerizable composition can be employed as the content of the oxygen permeability coefficient-reducing agent in the wavelength conversion layer.

Regarding preventing degradation of the quantum dot by oxygen, JP2013-544018A set forth above discloses that a barrier film is laminated on the main surface (the main surface will be described later) of the wavelength conversion layer containing the quantum dot, in order to protect the quantum dot from oxygen and the like. Additionally, JP2013-544018A also discloses that coating is applied on the whole outer surface of the wavelength conversion layer including side surfaces, in addition to the barrier film or instead of the barrier film.

The lamination of the barrier film as described above is one of the effective measures for preventing the reduction of light-emitting efficiency of the quantum dot, since the contamination of oxygen from the main surface of the wavelength conversion layer can be suppressed. However, with the barrier film, it is not possible to prevent the contamination of oxygen form surfaces that is not protected by the barrier layer (for example, side surfaces). In contrast to this, by coating the whole outer surface of the wavelength conversion layer as disclosed in JP2013-544018A, it becomes possible to suppress the contamination of oxygen from surfaces that is not protected by the barrier layer. In the case, however, it is necessary to apply coating after cutting out, to a product size, the wavelength conversion member including the wavelength conversion layer (for example, after stamping out by a stamping tool), which results in lowering of productivity.

Therefore, in order to prevent the lowering of the light emitting efficiency due to degradation of the quantum dot while maintaining the productivity, the present inventors have reached the conclusion that it is desirable to reduce an amount of contamination of oxygen into the wavelength conversion layer by allowing the wavelength conversion layer itself to be a less oxygen permeable layer. In addition thereto, as the result of the present inventors' intensive study, a wavelength conversion member including a wavelength conversion layer having an oxygen permeability coefficient of less than 150.0 $cm^3/m^2/day/atm$ per 1 mm thickness could be obtained by introducing the compound having the above-described oxygen permeability coefficient-reducing capability (oxygen permeability coefficient-reducing agent) into the wavelength conversion layer. The above-described wavelength conversion member according to an aspect of the present invention was devised on that basis.

In an embodiment, the wavelength conversion layer contains the oxygen permeability coefficient-reducing agent in an amount of 1 to 50 parts by weight.

In an embodiment, the oxygen permeability coefficient-reducing agent is at least one compound selected from the group consisting of a biphenyl compound, a hydrogenated biphenyl compound, a terphenyl compound, a bisphenol compound, a hydrogenated bisphenol compound, a trityl compound, a hydrogenated trityl compound, a rosin compound, a novolac compound, a cardo compound, a benzophenone compound and a dialkyl ketone compound.

In an embodiment, the oxygen permeability coefficient-reducing agent is a compound having a molecular weight of equal to or less than 2000.

In an embodiment, the wavelength conversion layer is a cured layer that has been formed by curing a polymerizable composition comprising the quantum dot and the oxygen permeability coefficient-reducing agent, and at least one polymerizable compound selected from the group consisting of a monofunctional (meth)acrylate compound, a polyfunctional (meth)acrylate compound and an epoxy compound.

In an embodiment, the thickness of the wavelength conversion layer ranges from 1 μm to 500 μm.

In an embodiment, the quantum dot is at least one selected from the group consisting of:

a quantum dot A having an emission center wavelength within a wavelength range of 600 nm to 680 nm, a quantum dot B having an emission center wavelength within a wavelength range of 500 nm to 600 nm, and a quantum dot C having an emission center wavelength within a wavelength range of 400 nm to 500 nm.

In an embodiment, the above wavelength conversion member has at least one layer selected from the group consisting of an inorganic layer and an organic layer on at least one main surface of the wavelength conversion layer. In this context, the "main surface" means a surface (front surface or back surface) of the wavelength conversion layer arranged at the viewing side or the backlight side when using the wavelength conversion member.

In an embodiment, the above wavelength conversion member has at least one layer selected from the group consisting of an inorganic layer and an organic layer on each of one main surface and the other main surface of the wavelength conversion layer.

A further aspect of the present invention relates to a backlight unit including at least the above wavelength conversion member and a light source.

In an embodiment, the above light source has an emission center wavelength within a wavelength range of 430 nm to 480 nm.

A still further aspect of the present invention relates to a liquid crystal display device including at least the above backlight unit and a liquid crystal cell.

According to an aspect of the present invention, it becomes possible to provide a wavelength conversion member capable of exhibiting excellent light emitting efficiency, as well as a backlight unit and a liquid crystal display device that are provided with the above wavelength conversion member.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Figure 1A:
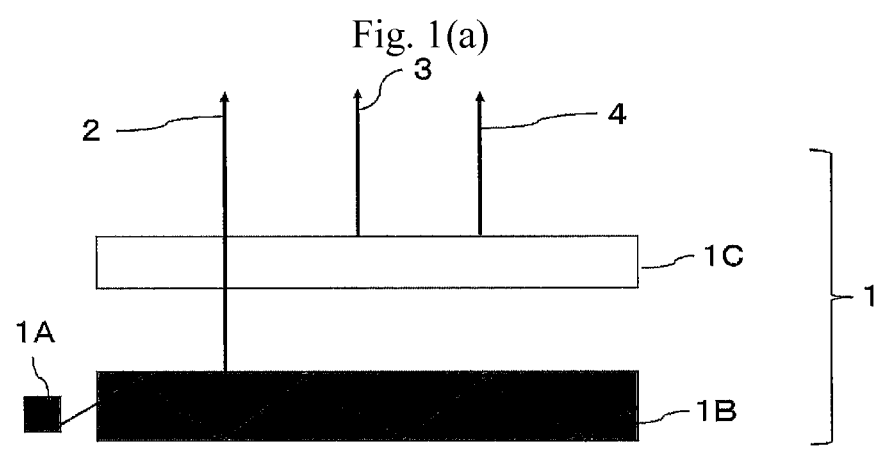
FIG. 1(*a*) and FIG. 1(*b*) are explanatory views showing one example of a backlight unit containing a wavelength conversion member according to an aspect of the present invention.

In the following, explanation may be carried out on the basis of typical embodiments of the present invention, but the present invention is not limited to these embodiments. In the present invention and the description, the numerical range represented by "to" means the range including the numerical values before and after the "to" as the upper limit and the lower limit.

In the present invention and the description, a "half width" of a peak means a width of the peak at ½ height of the peak. Light having an emission center wavelength within a wavelength range of 400 nm to 500 nm, preferably within a wavelength range of 430 nm to 480 nm is referred to as blue light, light having an emission center wavelength within a wavelength range of 500 nm to 600 nm is referred to as green light, light having an emission center wavelength within a wavelength range of 600 nm to 680 nm is referred to as red light.

In the present invention and the description, a "polymerizable composition" is a composition containing at least one polymerizable compound, and has a property of being cured by being subjected to polymerization treatment such as light irradiation and heating. In addition, a "polymerizable compound" is a compound containing one or more polymerizable groups in one molecule. The polymerizable group is a group capable of being involved in a polymerization reaction. Details will be explained below.

Furthermore, in the present invention and the description, descriptions relating to an angle such as orthogonal include a tolerance accepted in the technical field of the present invention. For example, the tolerance means being within a range of the exact angle less than ±10°, the tolerance from the exact angle being preferably equal to or less than 5°, more preferably equal to or less than 3°.

Wavelength Conversion Member

The wavelength conversion member according to an aspect of the present invention is a wavelength conversion member including a wavelength conversion layer containing at least one quantum dot which has a property of being excited with exciting light to emit fluorescence. The wavelength conversion layer includes the quantum dot and an at least one oxygen permeability coefficient-reducing agent, and an oxygen permeability coefficient per 1 mm thickness of the wavelength conversion layer is less than 150.0 cm$^3$/m$^2$/day/atm, and the oxygen permeability coefficient-reducing agent is a compound which exhibits an oxygen permeability coefficient-reducing capability of reducing the oxygen permeability coefficient per 1 mm thickness of the wavelength conversion layer by equal to or more than 30% per 10 parts by weight of the oxygen permeability coefficient-reducing agent relative to 100 parts by weight of the wavelength conversion layer except for the oxygen permeability coefficient-reducing agent.

The above wavelength conversion member will be further explained in detail below.

Wavelength Conversion Layer (Quantum Dot)

The wavelength conversion layer contains at least one quantum dot, and can contain two or more quantum dots with different light emission properties. Known quantum dots include a quantum dot A having an emission center wavelength within a wavelength range of 600 nm to 680 nm, a quantum dot B having an emission center wavelength within a wavelength range of 500 nm to 600 nm, and a quantum dot C having an emission center wavelength within a wavelength range of 400 nm to 500 nm By being excited with exciting light, the quantum dot A emits red light, the quantum dot B emits green light, and the quantum dot C emits blue light. For example, when entering blue light as exciting light to a wavelength conversion layer containing the quantum dot A and the quantum dot B, white light can be obtained by red light emitted from the quantum dot A, green light emitted from the quantum dot B and the blue light which has passed through the wavelength conversion layer. Alternatively, when entering ultraviolet light as exciting light to a wavelength conversion layer containing the quantum dots A, B and C, white light can be obtained by red light emitted from the quantum dot A, green light emitted from the quantum dot B and blue light emitted from the quantum dot C. As the quantum dots, any materials prepared by known methods and commercially available products can be used without limitation. With regard to the quantum dots, reference can be made to, for example, paragraphs 0060 to 0066 of JP 2012-169271A, which is expressly incorporated herein by reference in its entirety, but is not limited to the compounds described in the above publication. The emission wavelength of the quantum dot can usually be controlled by the composition and/or the size of particles.

The quantum dot may be added to the composition for forming the wavelength conversion layer in the form of particle or may be added in the dispersion obtained by being dispersed in a solvent. It is preferable to add the quantum dot in the form of dispersion because agglomeration of the quantum dot particles can be suppressed. The solvent to be used is not particularly limited. The quantum dot can be added in an amount of 0.01 to 10 parts by weight relative to 100 parts by weight of the total amount of the composition for forming the wavelength conversion layer.

The specific embodiments of the wavelength conversion in the wavelength conversion member having the wavelength conversion layer containing the quantum dot will be explained below with reference to drawings. The present invention, however, is not limited to the following specific embodiments.

Figure 1B:
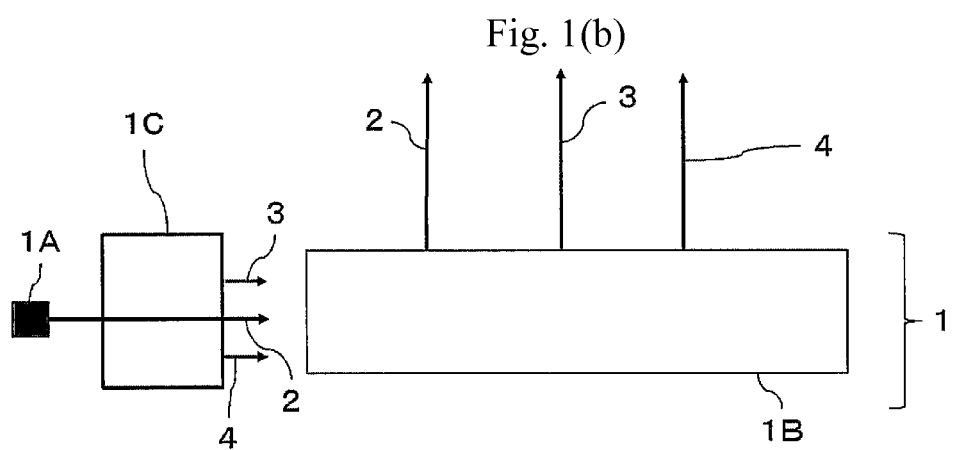

FIGS. 1(a) and 1(b) are explanatory views showing one example of a backlight unit 1 containing a wavelength conversion member according to an aspect of the present invention. In FIGS. 1(a) and 1(b), the backlight unit 1 is provided with a light source 1A and a light guide plate 1B for obtaining a surface light source. In the example shown in FIG. 1(a), the wavelength conversion member is arranged on a path of light emitted from the light guide plate. On the other hand, in the example shown in FIG. 1(b), the wavelength conversion member is arranged between the light guide plate and the light source.

In the example shown in FIG. 1(a), the light emitted from the light guide plate 1B enters a wavelength conversion member 1C. In the example shown in FIG. 1(a), light 2 emitted from the light source 1A arranged at an edge portion of the light guide plate 1B is blue light, and is emitted from the side of a liquid crystal cell (not shown) of the light guide plate 1B to the liquid crystal cell. The wavelength conversion member 1C arranged on the path of the light (blue light 2) emitted from the light guide plate 1B contains at least a quantum dot A which emits red light 4 upon excitation with the blue light 2, and a quantum dot B which emits green light 3 upon excitation with the blue light 2. From the backlight unit 1, the excited green light 3 and red light 4 and the blue light 2 which has passed through the wavelength conversion member 1C are thus emitted. The emission of the red light, the green light and the blue light as above can yield white light.

The example shown in FIG. 1(b) is the same as in the embodiment shown in FIG. 1(a) except that the arrangements of the wavelength conversion member and the light guide plate are different from each other. In the example shown in FIG. 1(b), the excited green light 3 and red light 4 and the blue light 2 which has passed through the wavelength conversion member 1C are emitted from the wavelength conversion member 1C and enter the light guide plate to thereby achieve a surface light source.

(Matrix)

In the wavelength conversion layer, the quantum dot is usually contained in a matrix. In this context, the matrix means a portion except for the quantum dot and the oxygen permeability coefficient-reducing agent described further below. The matrix is, for example, a polymer obtained by polymerizing a polymerizable composition by light irradiation or the like. The shape of the wavelength conversion layer is not particularly limited. For example, the wavelength conversion layer, and the wavelength conversion member containing the layer are in the form of sheet or film.

The polymerizable compound for preparation of the polymerizable composition is not particularly limited. The polymerizable compound may be used alone or in mixture of two or more kinds thereof. A content of the whole polymerizable compounds in the total amount of the polymerizable composition is preferably set to be approximately 10 to 99.99% by weight. One example of the preferred polymerizable compounds can include a monofunctional or polyfunctional (meth)acrylate compound such as monofunctional or polyfunctional (meth)acrylate monomer, a polymer thereof, a prepolymer thereof, from the viewpoints of transparency, adhesiveness, and the like of the cured film after curing. In the present invention and the description of "(meth)acrylate" means both or one of acrylate and methacrylate. The same also applies to "(meth)acryloyl" and the like.

Examples of the monofunctional (meth)acrylate compound can include acrylic acid and methacrylic acid, a derivative thereof, more specifically a compound having one polymerizable unsaturated bond of (meth)acrylic acid ((meth)acryloyl group) in one molecule. The specific examples thereof are listed below, and the present invention is not limited to these.

The examples include an alkyl (meth)acrylate having an alkyl group with 1 to 30 carbon atoms such as methyl (meth)acrylate, n-butyl (meth)acrylate, isobutyl (meth)acrylate, 2-ethylhexyl (meth)acrylate, isononyl (meth)acrylate, n-octyl (meth)acrylate, lauryl (meth)acrylate, and stearyl (meth)acrylate; an arylalkyl (meth)acrylate having an arylalkyl group with 7 to 20 carbon atoms such as benzyl (meth)acrylate; an alkoxyalkyl (meth)acrylate having an alkoxyalkyl group of 2 to 30 carbon atoms such as butoxyethyl (meth)acrylate; an aminoalkyl (meth)acrylate having a (mono-alkyl or di-alkyl) aminoalkyl group with 1 to 20 total carbon atoms such as N,N-dimethylaminoethyl (meth)acrylate; a (meth)acrylate of polyalkylene glycol alkyl ether having an alkylene chain with 1 to 10 carbon atoms and a terminal alkyl ether with 1 to 10 carbon atoms such as (meth)acrylate of diethylene glycol ethyl ether, (meth)acrylate of triethylene glycol butyl ether, (meth)acrylate of tetraethylene glycol monomethyl ether, (meth)acrylate of hexaethylene glycol monomethyl ether, monomethyl ether (meth)acrylate of octaethylene glycol, monomethyl ether (meth)acrylate of nonaethylene glycol, monomethyl ether (meth)acrylate of dipropylene glycol, monomethyl ether (meth)acrylate of heptapropylene glycol, and monoethyl ether (meth)acrylate of tetraethylene glycol; a (meth)acrylate of polyalkylene glycol aryl ether having an alkylene chain with 1 to 30 carbon atoms and a terminal aryl ether with 6 to 20 carbon atoms such as (meth)acrylate of hexaethylene glycol phenyl ether; a (meth)acrylate with 4 to 30 total carbon atoms having a cycloaliphatic structure such as cyclohexyl (meth)acrylate, dicyclopentanyl (meth)acrylate, isobornyl (meth)acrylate, and methylene oxide adduct cyclodecatriene (meth)acrylate; a fluorinated alkyl (meth)acrylate with 4 to 30 total carbon atoms such as heptadecafluorodecyl (meth)acrylate; a (meth)acrylate having hydroxyl group such as 2-hydroxyethyl (meth)acrylate, 3-hydroxypropyl (meth)acrylate, 4-hydroxybutyl (meth)acrylate, triethylene glycol mono(meth)acrylate, tetraethylene glycol mono(meth)acrylate, hexaethylene glycol mono(meth)acrylate, octapropylene glycol mono(meth)acrylate, and mono- or di-(meth)acrylate of glycerol; a (meth)acrylate having glycidyl group such as glycidyl (meth)acrylate; a polyethylene glycol mono(meth)acrylate having an alkylene chain of 1 to 30 carbon atoms such as tetraethylene glycol mono(meth)acrylate, hexaethylene glycol mono(meth)acrylate, and octapropylene glycol mono(meth)acrylate; a (meth)acrylamide such as (meth)acrylamide, N,N-dimethyl (meth)acrylamide, N-isopropyl (meth)acrylamide, 2-hydroxyethyl (meth)acrylamide, and acryloylmorpholine, and the like.

The monofunctional (meth)acrylate compound to be used is preferably an alkyl (meth)acrylate with 4 to 30 carbon atoms, and more preferably an alkyl (meth)acrylate with 12 to 22 carbon atoms from the viewpoint of enhancing dispersion of quantum dots. The more the dispersion of quantum dots is enhanced, the more the amount of light going directly from the wavelength conversion layer to the emission surface is increased, which is effective for enhancing a front brightness and a front contrast. Specifically, as the monofunctional (meth)acrylate compound, butyl (meth)acrylate, octyl (meth)acrylate, lauryl (meth)acrylate, oleyl (meth)acrylate, stearyl (meth)acrylate, behenyl (meth)acrylate, butyl (meth)acrylamide, octyl (meth)acrylamide, lauryl (meth)acrylamide, oleyl (meth)acrylamide, stearyl (meth)acrylamide, behenyl (meth)acrylamide, and the like are preferable. Among them, lauryl (meth)acrylate, oleyl (meth)acrylate, stearyl (meth)acrylate are particularly preferable.

In addition, the monofunctional (meth)acrylate compound to be preferably used is a monofunctional (meth)acrylate compound having one or more groups selected from the group consisting of hydroxyl group and an aryl group from the viewpoint of further reducing of the oxygen permeability coefficient of the wavelength conversion layer and enhancing adhesiveness to the other layer or member.

The group that the above monofunctional (meth)acrylate compound has is preferably hydroxyl group and phenyl group. Specific examples of the preferred compound include benzyl acrylate, phenoxyethyl acrylate, phenoxydiethylene glycol acrylate, 1,4-cyclohexanedimethanol mono-acrylate, 2-hydroxy-3-phenoxypropyl acrylate, and 4-hydroxybutyl acrylate.

A polyfunctional (meth)acrylate compound having two or more (meth)acryloyl groups in one molecule can also be used together with the above monomer having one polymerizable unsaturated bond of (meth)acrylic acid ((meth)acryloyl group) in one molecule. The specific examples thereof are included below, but the present invention is not limited to those.

An alkylene glycol di(meth)acrylate having an alkylene chain with 1 to 20 carbon atoms such as 1,4-butanediol di(meth)acrylate, 1,6-hexanediol di(meth)acrylate, or 1,9-nonanediol di(meth)acrylate; a polyalkylene glycol di(meth)acrylate having an alkylene chain with 1 to 20 carbon atoms such as polyethylene glycol di(meth)acrylate, or polypropylene glycol di(meth)acrylate; a tri(meth)acrylate with 10 to 60 total carbon atoms such as trimethylol propane tri(meth)acrylate or ethylene oxide adduct trimethylol propane tri(meth)acrylate; a tetra(meth)acrylate with 10 to 100 total carbon atoms such as ethylene oxide adduct pentaerythritol tetra(meth)acrylate, ditrimethylol propane tetra(meth)acrylate, or pentaerythitol tetra(meth)acrylate; dipentaerythritol hexa(meth)acrylate, and the like are included in the specific examples.

An amount of the polyfunctional such as difunctional or trifunctional (meth)acrylate monomer to be used is preferably set to be equal to or more than 5 parts by weight from the viewpoint of coating film strength, and is preferably set to be equal to or less than 95 parts by weight from the viewpoint of suppressing gelation of the composition relative to 100 parts by weight of the total polymerizable compounds contained in the polymerizable composition. Furthermore, from the same point of view, an amount of the monofunctional (meth)acrylate compound is preferably set to be equal to or more than 5 parts by weight and equal to or less than 95 parts by weight relative to 100 parts by weight of the total polymerizable compounds contained in the polymerizable composition.

Preferred polymerizable compound can include a compound having a cyclic group such as a cyclic ether group which is capable of ring-open polymerization such as an epoxy group or an oxetanyl group. More preferably, a compound (epoxy compound) having an epoxy group can be included as such a compound.

As the epoxy compound, an aliphatic cyclic epoxy compound, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, hydrogenated bisphenol A diglycidyl ether, hydrogenated bisphenol F diglycidyl ether, hydrogenated bisphenol S diglycidyl ether, 1,4-butanediol diglycidyl ether, 1,6-hexanediol diglycidyl ether, glycerine triglycidyl ether, trimethylolpropane triglycidyl ether, polyethylene glycol diglycidyl ether, polypropylene glycol diglycidyl ethers; polyglycidyl ethers of polyether polyol obtained by adding one or two or more of alkylene oxide to an aliphatic polyhydric alcohol such as ethylene glycol, propylene glycol or glycerine; diglycidyl esters of an aliphatic long chain dibasic acid; monoglycidyl ethers of an aliphatic higher alcohol; monoglycidyl ethers of phenol, cresol or a polyether alcohol obtained by adding an alkylene oxide thereto; glycidyl esters of a higher aliphatic acid, and the like can be exemplified.

Examples of the epoxy compound can further include polyglycidyl esters of a polybasic acid, polyglycidyl ethers of a polyhydric alcohol, polyglycidyl ethers of a polyoxyalkylene glycol, polyglycidyl ethers of an aromatic polyol, hydrogenated compound of polyglycidyl ethers of an aromatic polyol, urethane polyepoxy compound, and epoxylated polybutadienes, and the like.

Among the above components, an aliphatic cyclic epoxy compound, bisphenol A diglycidyl ether, bisphenol F diglycidyl ether, hydrogenated bisphenol A diglycidyl ether, hydrogenated bisphenol F diglycidyl ether, 1,4-butanediol diglycidyl ether, 1,6-hexanediol diglycidyl ether, glycerine triglycidyl ether, trimethylolpropane triglycidyl ether, neopentyl glycol diglycidyl ether, polyethylene glycol diglycidyl ether, polypropylene glycol diglycidyl ether are preferable.

Examples of preferred commercially available glycidyl group-containing compound can include UVR-6216 (manufactured by Union Carbide), Glycidol, AOEX24, Cyclomer A200 (these are manufactured by Daicel Chemical Industries), Epikote 828, Epikote 812, Epikote 1031, Epikote 872, Epikote CT508 (these are manufactured by YUKA Shell), KRM-2400, KRM-2410, KRM-2408, KRM-2490, KRM-2720, KRM-2750 (these are manufactured by ADEKA), and the like. These can be used alone or in combination of two or more kinds thereof.

Furthermore, any manufacturing method of the epoxy compound may be used. For example, these can be synthesized by referring to the literatures such as JIKKEN KAGAKU KOUZA 20 ORGANIC SYNTHESIS II, fourth edition, 213-, published by Maruzen KK, 1992, Ed. by Alfred Hasfner, The chemistry of heterocyclic compounds-Small Ring Heterocycles part 3 Oxiranes, John & Wiley and Sons, An Interscience Publication, New York, 1985, Yoshimura, ADHESION Vol. 29, No. 12, 32, 1985, Yoshimura, ADHESION Vol. 30, No. 5, 42, 1986, Yoshimura, ADHESION Vol. 30, No. 7, 42, 1986, JP H11-100378 A, JP 2906245 B, and JP2926262 B. The contents of the above literatures and publications are expressly incorporated herein by reference in their entirety.

The above polymerizable composition can contain, as a polymerization initiator, a known radical polymerization initiator or a cationic polymerization initiator. With respect to the polymerization initiator, for example, the descriptions of paragraph 0037 of JP 2013-043382A, and paragraphs 0040 to 0042 of JP 2011-159924A can be referred to. The contents of the above publications are expressly incorporated herein by reference in their entirety. An amount of the polymerization initiator is preferably equal to or more than 0.1 mole % relative to the total amount of the polymerizable compounds contained in the polymerizable composition, more preferably 0.5 to 5 mole %.

(Oxygen Permeability Coefficient-Reducing Agent)

The wavelength conversion member according to an aspect of the present invention contains at least one oxygen permeability coefficient-reducing agent in the wavelength conversion layer containing the quantum dot explained above. The oxygen permeability coefficient-reducing agent is a compound having the oxygen permeability coefficient-reducing capability set forth above. Therefore, with the oxygen permeability coefficient-reducing agent, it is possible to reduce, by equal to or more than 30%, the oxygen permeability coefficient converted to 1 mm thickness of the wavelength conversion layer, that is, the oxygen permeability coefficient per 1 mm thickness, when adding 10 parts by weight of the oxygen permeability coefficient-reducing agent, that is, as an oxygen permeability coefficient-reducing rate per 10 parts by weight of the oxygen permeability coefficient-reducing agent relative to 100 parts by weight of the wavelength conversion layer except for the oxygen permeability coefficient-reducing agent. As described above, the oxygen permeability coefficient-reducing rate is defined per 10 parts by weight of the content of the oxygen permeability coefficient-reducing agent, but a content of the oxygen permeability coefficient-reducing agent in the wavelength conversion layer of the wavelength conversion member according to an aspect of the present invention is not limited to 10 parts by weight. In the following, the oxygen permeability coefficient is set to be an oxygen permeability coefficient converted to 1 mm thickness, unless otherwise noted. The oxygen permeability coefficient can be measured by a known method. As to one example of the measuring method, Examples described further below can be referred to. The oxygen permeability coefficient-reducing rate can be calculated by the following method 1 or the method 2.

Method 1: An oxygen permeability coefficient of the wavelength conversion layer (layer to be measured) which contains 10 parts by weight of the oxygen permeability coefficient-reducing agent relative to 100 parts by weight of the wavelength conversion layer except for the oxygen permeability coefficient-reducing agent, and an oxygen permeability coefficient of the wavelength conversion layer (reference layer) which is the same except that no oxygen permeability coefficient-reducing agent is contained are measured, and are then converted to values per 1 mm thickness. An oxygen permeability coefficient-reducing rate is calculated by the thus obtained oxygen permeability coefficients according to the following equation.

Oxygen permeability coefficient-reducing rate=
[(Oxygen permeability coefficient of the reference layer−Oxygen permeability coefficient of the layer to be measured)/(Oxygen permeability coefficient of the reference layer)]×100

Method 2: With regard to a reference sample formed from a composition which is the same as the quantum dot-containing composition used for the formation of the wavelength conversion layer except that the oxygen permeability coefficient-reducing agent is removed, and a sample to be measured formed from a composition obtained by adding the oxygen permeability coefficient-reducing agent to the composition to be used for producing the reference sample, in an amount of 10 parts by weight relative to 100 parts by weight of the composition, each oxygen permeability coefficient is measured, and then converted to values per 1 mm thickness. An oxygen permeability coefficient-reducing rate is calculated using the following equation, from the oxygen permeability coefficient thus obtained. The sample can be in any shape such as a sheet shape or a film shape.

Oxygen permeability coefficient-reducing rate=
[(Oxygen permeability coefficient of the reference sample−Oxygen permeability coefficient of the sample to be measured)/(Oxygen permeability coefficient of the reference sample)]×100

The oxygen permeability coefficient-reducing rate of the oxygen permeability coefficient-reducing agent is equal to or more than 30%, preferably equal to or more than 40%, more preferably equal to or more than 45%, further preferably equal to or more than 50%, and further more preferably more than 50%. The oxygen permeability coefficient-reducing rate is, for example, equal to or less than 90% equal to or less than, equal to or less than 80%, or equal to or less than 70%, but the upper limit is not limited because the higher value is more preferable.

The oxygen permeability coefficient-reducing agent is not particularly limited as long as the agent has the oxygen permeability coefficient-reducing capability set forth above. A preferable embodiment of the compound to be used as the oxygen permeability coefficient-reducing agent can include a compound having a ring structure, or a compound having a linear or branched alkyl group of a relatively long chain, for example, 10 to 20 carbon atoms, or the like. Specific examples can include at least one compound selected from the group consisting of a biphenyl compound, a hydrogenated biphenyl compound, a terphenyl compound, a bisphenol compound, a hydrogenated bisphenol compound, a trityl compound, a hydrogenated trityl compound, a rosin compound, a novolac compound, a cardo compound, a benzophenone compound and a dialkyl ketone compound. Examples of the bisphenol compound can include a bisphenol A type compound, a bisphenol B type compound, a bisphenol C type compound, a bisphenol E type compound, a bisphenol F type compound, a bisphenol G type compound, a bisphenol M type compound, a bisphenol S type compound, a bisphenol P type compound, a bisphenol T type compound, a bisphenol Z type compound, and the like. The oxygen permeability coefficient-reducing agent can be used alone or in combination of two or more kinds thereof.

In an embodiment, a compound having a relatively small molecular weight may have a tendency to have a good oxygen permeability coefficient-reducing capability. The present inventors assume that the fact that the compound having a relatively small molecular weight can easily enter into the gap between the matrix can contribute to the tendency, but this assumption is just an assumption and does not limit the present invention. The molecular weight is preferably equal to or less than 2000, more preferably equal to or less than 1000, further more preferably equal to or less than 500, and still further preferably equal to or less than 300. The molecular weight is, for example, equal to or more than 100, but the lower limit is not particularly limited. In addition, when the oxygen permeability coefficient-reducing agent is a polymer having repeating units, its molecular weight means a weight-average molecular weight. Additionally, in an embodiment, the oxygen permeability coefficient-reducing agent can be a compound which does not have a polymerizable functional group in the molecule. In this context, the polymerizable functional group means a functional group which can cause a polymerization reaction by a polymerization treatment such as light irradiation or heating.

The weight-average molecular weight is set to be a value obtained by calculating a measured value by gel permeation chromatography (GPC) according to polystyrene conversion. One example of the specific measuring conditions of the weight-average molecular weight can include the following measuring conditions. The weight-average molecular weight mentioned in Examples described further below is a value measured by the following conditions.

GPC device: HLC-8120 (manufactured by TOSOH)
Column: TSK gel Multipore HXL-M (manufactured by TOSOH 7.8 mm ID (inside diameter)×30.0 cm)
Eluent: Tetrahydrofuran (THF)

More specifically, the following compounds can be exemplified as the oxygen permeability coefficient-reducing agent. In the present invention and the description, the "group" such as alkyl group may have or may not have a substituent, unless otherwise noted. Furthermore, the number of carbon atoms when mentioned, means a number of carbon atoms including the number of carbon atoms of the substituent. When a certain group has a substituent, examples of the substituent can include an alkyl group (for example an alkyl group with 1 to 6 carbon atoms), hydroxyl group, an alkoxy group (for example an alkoxy group with 1 to 6 carbon atoms), a halogen atom (for example fluorine atom, chlorine atom, bromine atom), cyano group, amino group, nitro group, acyl group, carboxyl group, and the like.

The alkyl group mentioned herein below is a linear or branched alkyl group, or includes a cycloalkyl group unless otherwise noted. In the c except for formula 12, the alkyl group is an alkyl group having preferably 1 to 5, more preferably 1 to 3, further preferably 1 or 2 carbon atoms. On the other hand, for formula 12, the alkyl group is an alkyl group having preferably 10 to 20, more preferably 12 to 20, further preferably 15 to 20 carbon atoms.

The acyl group mentioned below is represented by R(C=O)—, wherein R is an alkyl group.

The acyloxy group mentioned below is represented by R(C=O)—O—, wherein R is a linear or branched alkyl group or a cycloalkyl group.

For the alkyl group represented by R of the acyl group and the linear or branched alkyl group represented by R of the acyloxy group, details are the same as described for the formulae except for formula 12. The cycloalkyl group represented by R of the acyloxy group is preferably cyclohexyl group.

The alkyloxy group mentioned below is represented by R—O—, wherein R is an alkyl group. Details of the alkyl group are the same as described for the formulas except for formula 12.

The phenylalkylene group mentioned below is represented by Ph-X—, wherein Ph is phenyl group, X is an alkylene group. Preferred alkylene group is a linear or branched alkylene group with 1 to 6 carbon atoms, and one example is dimethylmethylene group (—C(CH$_3$)$_2$—).

Formula 1: Biphenyl compound

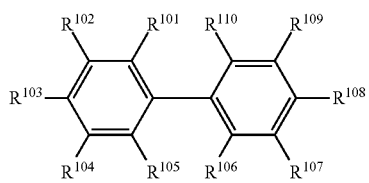

In formula 1, each of $R^{101}$ to $R^{110}$ represents independently a hydrogen atom, an alkyl group, an acyl group, an alkyloxy group, or a hydroxyl group. From the viewpoint of the oxygen permeability coefficient-reducing rate, at least one of the $R^{101}$ to $R^{110}$ preferably represents the group other than a hydrogen atom, more preferably represents a hydroxyl group, further preferably one or two thereof represent a hydroxyl group, still further preferably two thereof represent a hydroxyl group.

Formula 2: Terphenyl compound

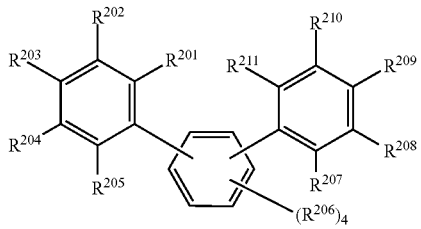

In formula 2, each of $R^{201}$ to $R^{211}$ represents independently a hydrogen atom, an alkyl group, an acyl group, an alkyloxy group, a hydroxyl group, a phenyl group, or a cyano group. From the viewpoint of the oxygen permeability coefficient-reducing rate, at least one of the $R^{201}$ to $R^{211}$ preferably represents the group other than a hydrogen atom, more preferably represents a hydroxyl group. In formula 2, the bonding positions of the two benzene rings which bond to the benzene ring having the —$(R^{206})_4$ may be ortho-position, meta-position, or para-position, and is preferably para-position. In the —$(R^{206})_4$, the four $R^{206}$s may be the same or different from each other.

Formula 3: Bisphenol compound

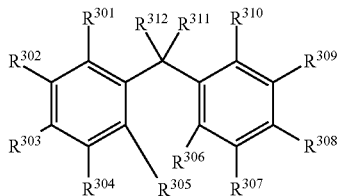

In formula 3, each of $R^{301}$ to $R^{312}$ represents independently a hydrogen atom, an alkyl group, an acyl group, an alkyloxy group, a hydroxyl group, a phenyl group, or a phenylalkylene group. At least one of the $R^{301}$ to $R^{312}$ preferably represents the group other than a hydrogen atom. $R^{311}$ and $R^{312}$ may independently represent an alkyl group or phenyl group, or bond together to form a cycloalkane ring. The cycloalkane ring is preferably a substituted or unsubstituted cyclohexane ring, preferably a substituted cyclohexane ring. The substituent is preferably an alkyl group, and more preferably methyl group. From the viewpoint of the oxygen permeability coefficient-reducing rate, at least one of the $R^{301}$ to $R^{310}$ is preferably a hydroxyl group, an alkyloxy group (more preferably methoxy group), or a phenylalkylene group.

Formula 4: Trityl compound

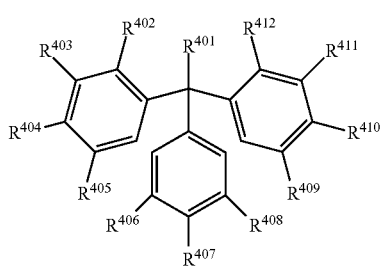

In formula 4, each of $R^{401}$ to $R^{412}$ represents independently a hydrogen atom, an alkyl group, an acyl group, an acyloxy group, an alkyloxy group, a hydroxyl group, or a phenyl group. From the viewpoint of the oxygen permeability coefficient-reducing rate, at least one of the $R^{401}$ to $R^{412}$ preferably represents the group other than a hydrogen atom, more preferably represents a hydroxyl group.

Formula 5: Hydrogenated biphenyl compound

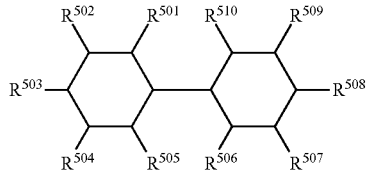

In formula 5, each of $R^{501}$ to $R^{510}$ represents independently a hydrogen atom, an alkyl group, an acyl group, an acyloxy group, an alkyloxy group, or a hydroxyl group. From the viewpoint of the oxygen permeability coefficient-reducing rate, at least one of the $R^{501}$ to $R^{510}$ preferably represents the group other than a hydrogen atom, more preferably represents a hydroxyl group, further preferably two thereof represent a hydroxyl group.

Formula 6: Hydrogenated bisphenol compound

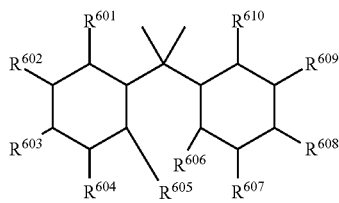

In formula 6, each of $R^{601}$ to $R^{610}$ represents independently a hydrogen atom, an alkyl group, an acyl group, an acyloxy group, an alkyloxy group, or a hydroxyl group. From the viewpoint of the oxygen permeability coefficient-reducing rate, at least one of the $R^{601}$ to $R^{610}$ preferably represents the group other than a hydrogen atom, more preferably represents an alkyloxy group, further preferably two thereof represent an alkyloxy group, still further preferably the alkyloxy group represents methoxy group.

Formula 7: Hydrogenated trityl compound

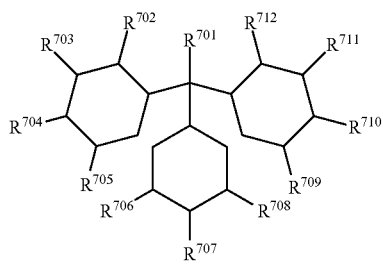

In formula 7, each of $R^{701}$ to $R^{712}$ represents independently a hydrogen atom, an alkyl group, an acyl group, an alkyloxy group, a hydroxyl group, or a phenyl group. From the viewpoint of the oxygen permeability coefficient-reducing rate, at least one of the $R^{701}$ to $R^{712}$ preferably represents the group other than a hydrogen atom, more preferably represents a hydroxyl group.

Formulas 8a, 8b: Rosin compound

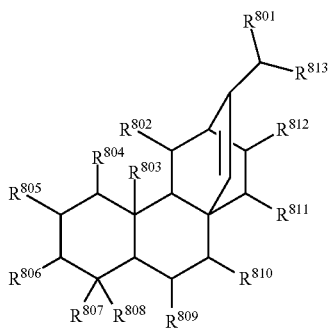

(8a)

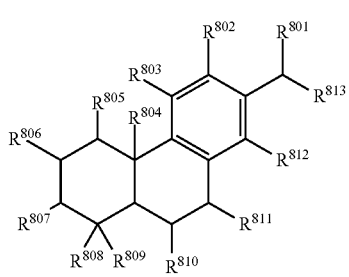

(8b)

In formulas 8a, 8b, each of $R^{801}$ to $R^{813}$ represents independently a hydrogen atom, an alkyl group, an acyl group, an alkyloxy group, a hydroxyl group, a carboxyl group, or a phenyl group. From the viewpoint of the oxygen permeability coefficient-reducing rate, at least one of the $R^{801}$ to $R^{813}$ preferably represents the group other than a hydrogen atom, more preferably represents a carboxyl group. Examples of commercially available product include RONDIS R, RONDIS K-25, RONDIS K-80, RONDIS K-18 (all of them are trade names, and rosin derivatives, manufactured by ARAKAWA Chemical Industries, Ltd.), PINECRYSTAL KR-85, PINECRYSTAL KR-120, PINECRYSTAL KR-612, PINECRYSTAL KR-614, PINECRYSTAL KE-100, PINECRYSTAL KE-311, PINECRYSTAL KE-359, PINECRYSTAL KE-604, PINECRYSTAL 30PX, PINECRYSTAL D-6011, PINECRYSTAL D-6154, PINECRYSTAL D-6240, PINECRYSTAL KM-1500, PINECRYSTAL KM-1550 (all of them are trade names, and ultra-pale colored rosin derivatives, manufactured by ARAKAWA Chemical Industries, Ltd.), ARADIME R-140, ARADIME R-95 (all of them are trade names, and polymerized rosin, manufactured by ARAKAWA Chemical Industries, Ltd.), HYPALE CH (all of them are trade names, and hydrogenated rosin, manufactured by ARAKAWA Chemical Industries, Ltd.), BEAMSET 101 (all of them are trade names, and rosin acrylate, manufactured by ARAKAWA Chemical Industries, Ltd.), and the like.

Formula 9: Structural unit contained in novolac compound

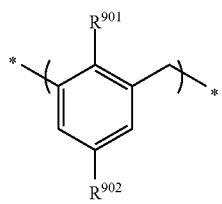

In formula 9, each of $R^{901}$ to $R^{902}$ represents independently a hydrogen atom, an alkyl group, an acyl group, an alkyloxy group, a hydroxyl group, or a phenyl group, and at least one preferably represents the group other than a hydrogen atom. In formula 9, * represents the position bonded to the adjacent structure.

In the novolac compound having the structure unit represented by formula 9, the number of the structural units is two or more, for example, in the range of 2 to 10. $R^{901}$, $R^{902}$ in the structural units which exist a plural in one molecule may be different or the same in each structural unit. From the viewpoint of the oxygen permeability coefficient-reducing rate, it is preferable that at least one of $R^{901}$, $R^{902}$ of at least one of the structural units is a hydroxyl group, it is more preferable that at least one of $R^{901}$, $R^{902}$ of two or more structural units is a hydroxyl group, and it is further preferable that at least one of $R^{901}$, $R^{902}$ of all structural units is a hydroxyl group.

Formula 10: Cardo compound

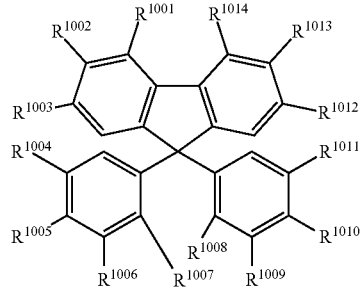

In formula 10, each of $R^{1001}$ to $R^{1014}$ represents independently a hydrogen atom, an alkyl group, an acyl group, an alkyloxy group, a hydroxyl group, or a phenyl group. From the viewpoint of the oxygen permeability coefficient-reducing rate, at least one of the $R^{1001}$ to $R^{1014}$ preferably represents the group other than a hydrogen atom, more preferably represents a hydroxyl group.

Formula 11: Benzophenone compound

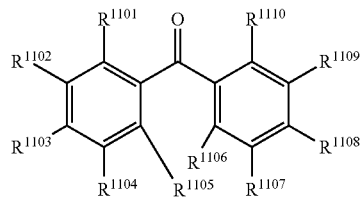

In formula 11, each of $R^{1101}$ to $R^{1110}$ represents independently a hydrogen atom, an alkyl group, an acyl group, an alkyloxy group, a hydroxyl group, or a phenyl group. From the viewpoint of the oxygen permeability coefficient-reducing rate, at least one of the $R^{1101}$ to $R^{1110}$ preferably represents the group other than a hydrogen atom, more preferably represents a hydroxyl group.

Formula 12: Dialkyl ketone compound

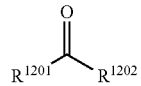

$R^{1201}$, $R^{1202}$ represents independently an alkyl group. Details of the alkyl group are as explained above. Examples of the preferred compounds include pelargone, laulone, stearone, and the like.

In the following, examples of compounds which can be used as the oxygen permeability coefficient agent are shown, but the present invention is not limited the following examples.
(1)
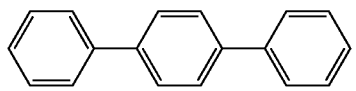
(2)
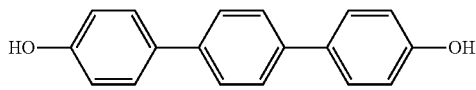
(3)
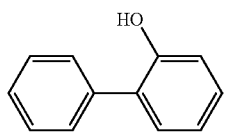
(4)
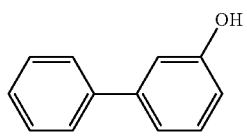
(5)
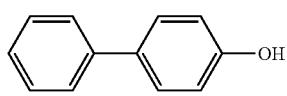
(6)
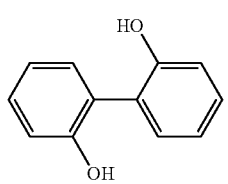 [SMILES: Oc1ccccc1-c1ccccc1O]
(7)
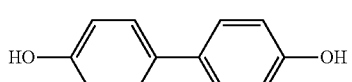
(8)
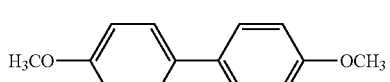
(9)
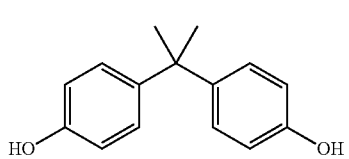
(10)
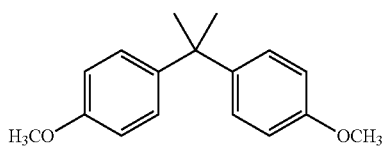
(11)
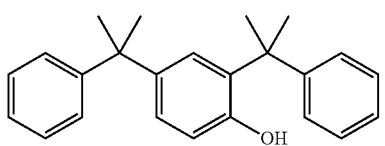
-continued
(12)
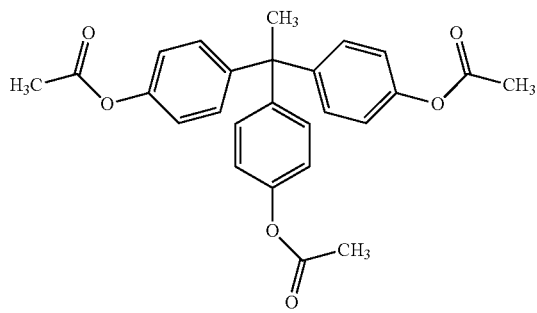
(13)
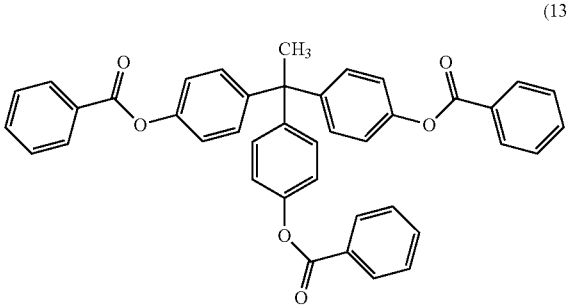
(14)
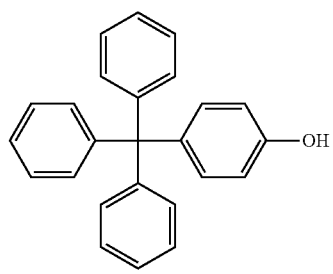
(15)
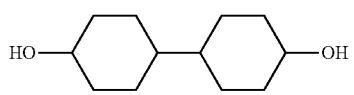
(16)
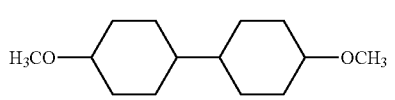
(17)
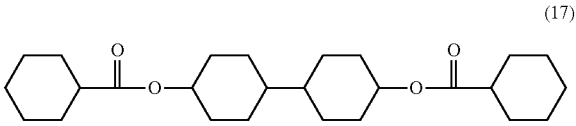
(18)
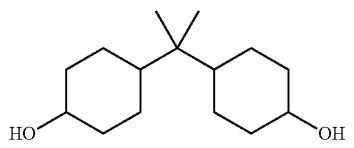
(19)

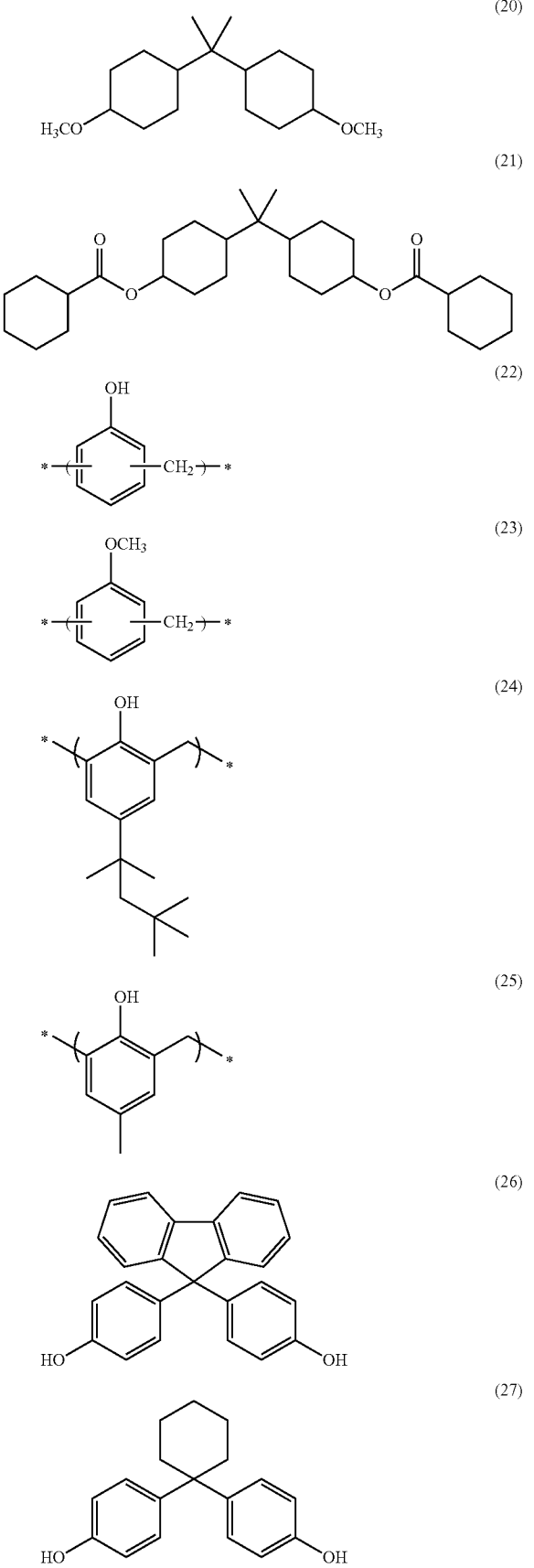

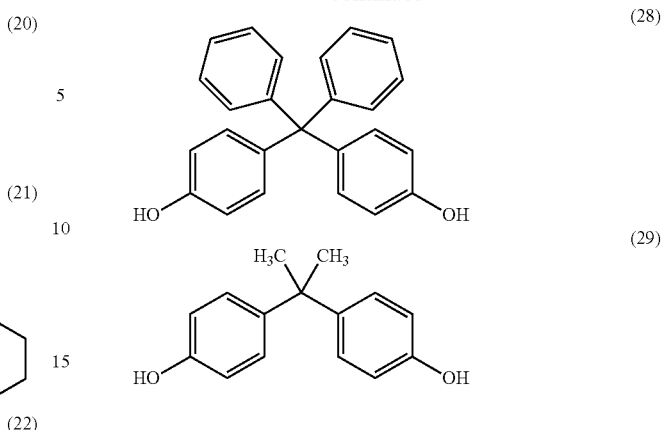

The oxygen permeability coefficient-reducing agent set forth above can be synthesized by a known method and is available as a commercial product.

The oxygen permeability coefficient-reducing agent is preferably contained in the wavelength conversion layer in such an amount that the oxygen permeability coefficient of the wavelength conversion layer containing the agent is less than 150.0 $cm^3/m^2/day/atm$ as a oxygen permeability coefficient converted per 1 mm thickness. From this point of view, the content is preferably within a range of 1 to 50 parts by weight relative to the above-described basis, more preferably within a range of 1 to 30 parts by weight, and further preferably within a range of 1 to 20 parts by weight.

(Optional Component)

The wavelength conversion layer may optionally contain one or more kinds of components in addition to the above-described components. One example of the optional components can include light scattering particles. The "light scattering particles" mean particles having a particle size of equal to or more than 0.10 μm. The light scattering is caused by optical unevenness in the layer. Even when particles having a sufficiently small particle size are contained, the optical evenness of the layer is not largely lowered, whereas the particles having a particle size of equal to or more than 0.10 μm are particles which make the layer optically uneven to thereby be able to give light scattering. The light scattering particles are preferably contained in the wavelength conversion layer from the viewpoint of enhancing brightness.

The above-described particle size is a value obtained by observation through a scanning electron microscope (SEM). Specifically, after photographing the cross-section of the wavelength conversion layer by 5000 magnifications, a primary particle size is measured from the obtained photograph image. Additionally, in the case of a particle which is not spherical, an average value of a length of major axis and a length of minor axis obtained is adopted as a primary particle size. The primary particle size thus obtained from such methods is set to be a particle size of the above-described particles. In addition, an average particle size of the light scattering particles is an arithmetic average of particle sizes of 20 particles selected at random from among the particles having a particle size of equal to or more than 0.10 μm in the above-described photographed image. The average particle size of the light scattering particles shown in Examples described further below is a value obtained by observing and measuring a cross-section of the wavelength conversion layer by using S-3400N manufactured by HITACHI Hi-Tech as the scanning electron microscope.

As described above, the particle size of the light scattering particle is equal to or more than 0.10 µm. From the viewpoint of the light scattering effect, the particle size of the light scattering particle is preferably within a range of 0.10 µm to 15.0 µm, more preferably within a range of 0.10 µm to 10.0 µm, and further preferably 0.20 µm to 4.0 µm. Additionally, in order to further enhance the brightness and to control the brightness distribution to viewing angle, two or more of the light scattering particle having different particle sizes may be mixed.

The light scattering particle may be an organic particle or an inorganic particle, or an organic inorganic composite particle. For example, a synthetic resin particle can be included as the organic particle. Specific examples include a silicone resin particle, an acryl resin particle (polymethyl methacrylate (PMMA)), a Nylon resin particle, a styrene resin particle, a polyethylene particle, a urethane resin particle, a benzoguanamine particle, and the like. From the viewpoint of the light scattering effect, the light scattering particle and other portion preferably have different refractive index in the matrix of the wavelength conversion layer, and in this regard, the silicone resin particle and the acryl resin particle are preferable from the viewpoint of easily obtaining the particle having a suitable refractive index. In addition, a particle of hollow structure can be used. Furthermore, a particle of diamond, titanium oxide, zirconium oxide, lead oxide, lead carbonate, zinc oxide, zinc sulfide, antimony oxide, silicon oxide, aluminum oxide, or the like can be used as the inorganic particle, and from the viewpoint of easily obtaining the particle having a suitable refractive index, titanium oxide and aluminum oxide are preferable.

From the light scattering effect and the viewpoint of brittleness of the wavelength conversion layer containing the particle, the light scattering particle is preferably contained, in the wavelength conversion layer, in an amount of equal to or more than 0.2% by volume on the basis of volume relative to 100% by volume of the whole of the wavelength conversion layer, more preferably 0.2% by volume to 50% by volume, further preferably 0.2% by volume to 30% by volume, still further preferably 0.2% by volume to 10% by volume.

In order to control the refractive index of the portion other than the light scattering particle in the matrix, a particle having a smaller particle size than the light scattering particle can be used as a refractive index controlling particle. A particle size of the refractive index controlling particle is less than 0.10 µm.

A particle of diamond, titanium oxide, zirconium oxide, lead oxide, lead carbonate, zinc oxide, zinc sulfide, antimony oxide, silicon oxide, aluminum oxide, or the like can be included as the refractive index controlling particle. The refractive index controlling particle may be used in such an amount that the refractive index can be controlled, and a content in the wavelength conversion layer is not particularly limited.

Oxygen Permeability Coefficient of Wavelength Conversion Layer

The oxygen permeability coefficient per 1 mm of the wavelength conversion layer is, as described above, less than 150.0 $cm^3/m^2/day/atm$. The unit "$cm^3/m^2/day/atm$" may also be referred to as "$cm^3/(m^2 \cdot day \cdot atm)$". If the wavelength conversion layer in which oxygen permeability is suppressed, even when, for example, the side surface of the wavelength conversion layer is exposed to air, it is possible to suppress the reduction of light emission efficiency at the side edge portion of the wavelength conversion layer. The present inventors assume that this is because the contamination of oxygen from the side surface can be suppressed by the fact that the wavelength conversion layer itself is difficult to permeate oxygen. The oxygen permeability coefficient per 1 mm of the wavelength conversion layer is preferably equal to or less than 100.0 $cm^3/m^2/day/atm$, more preferably equal to or less than 50.0 $cm^3/m^2/day/atm$. On the other hand, the lower limit is, for example, equal to or more than 0.0001 $cm^3/m^2/day/atm$, or equal to or more than 0.001 $cm^3/m^2/day/atm$, and the lower limit is not particularly limited because the contamination of oxygen into the wavelength conversion layer can be prevented as the lower limit is lower.

Method of Forming Wavelength Conversion Layer

Method of forming the wavelength conversion layer is not particularly limited as long as a layer containing the above-described components and known additives capable of being optionally added. The wavelength conversion layer containing the quantum dot and the oxygen permeability coefficient-reducing agent in the matrix can be formed by applying, on a suitable base material, the quantum dot-containing polymerizable composition (composition for forming wavelength conversion layer) which is prepared through simultaneously and sequentially mixing the above-described components and one or more known additives being optionally added, as necessary, and then by polymerizing and curing the coating film by being subjected to polymerization treatment such as light irradiation or heating. One example of the known additives can include a silane coupling agent capable of enhancing adhesion to an adjacent layer. Any known one can be used as a silane coupling agent without any limitation. From the viewpoint of adhesion, preferred silane coupling agent can include a silane coupling agent represented by formula (1) described in JP 2013-43382A, which is expressly incorporated herein by reference in its entirety. Details can be referred to paragraphs 0011 to 0016 of JP 2013-43382A. The amount of the additives used such as the silane coupling agent is not particularly limited, and can be optionally set. In addition, a solvent may be added as necessary, for a viscosity or the like of the quantum dot-containing polymerizable composition. In this case, the kind and the amount of the solvent to be used are not particularly limited. For example, an organic solvent can be used alone or by mixing two or more kinds thereof.

Examples of the coating method include known coating methods such as curtain coating method, dip coating method, spin coating method, print coating method, spray coating method, slot coating method, roll coating method, slide coating method, blade coating method, gravure coating method, and wire bar method. The curing conditions can be appropriately set depending on the type of the polymerizable compound and the composition of the polymerizable composition. In addition, when the polymerizable composition containing quantum dots is a composition containing a solvent, a drying treatment for removing the solvent may be carried out before a polymerization treatment.

The polymerization treatment of the quantum dot-containing polymerizable composition can be carried out in the manner that the composition is sandwiched between two base materials. One embodiment of the production steps of the wavelength conversion member including the polymerization treatment will be described below by referring to drawings. However, the present invention is not limited to the following embodiment.

Figure 3:
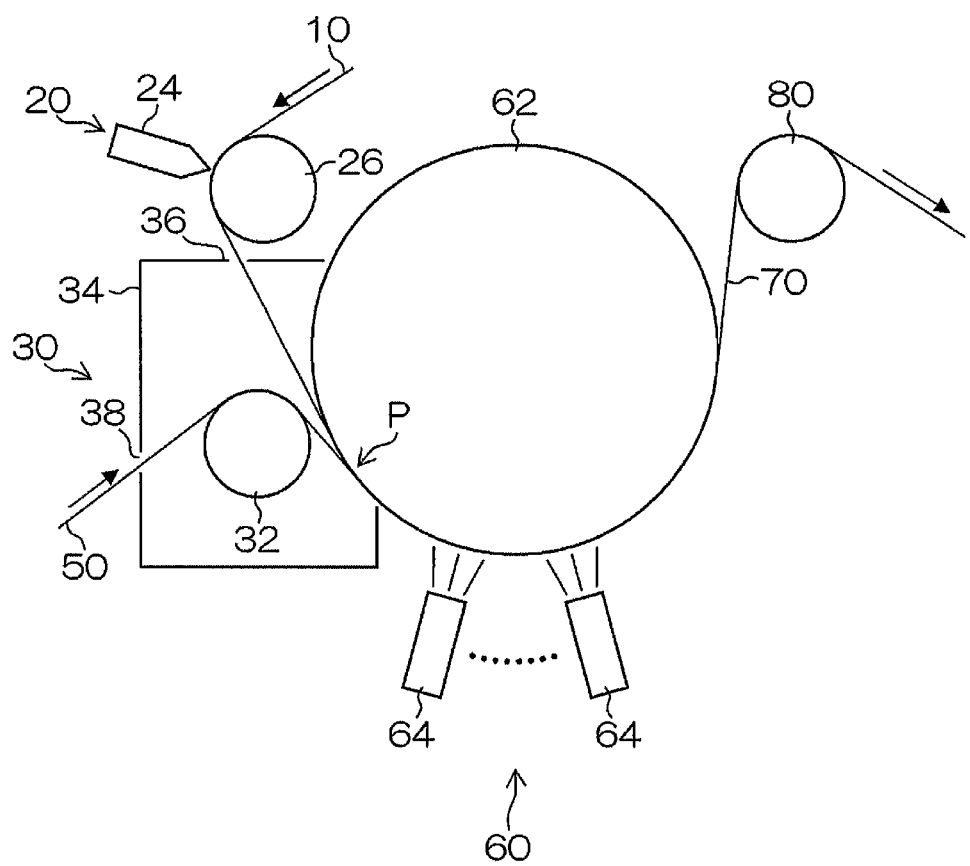
FIG. 3 is a schematic configuration diagram of one example of an apparatus of manufacturing a wavelength conversion member.
Figure 4:
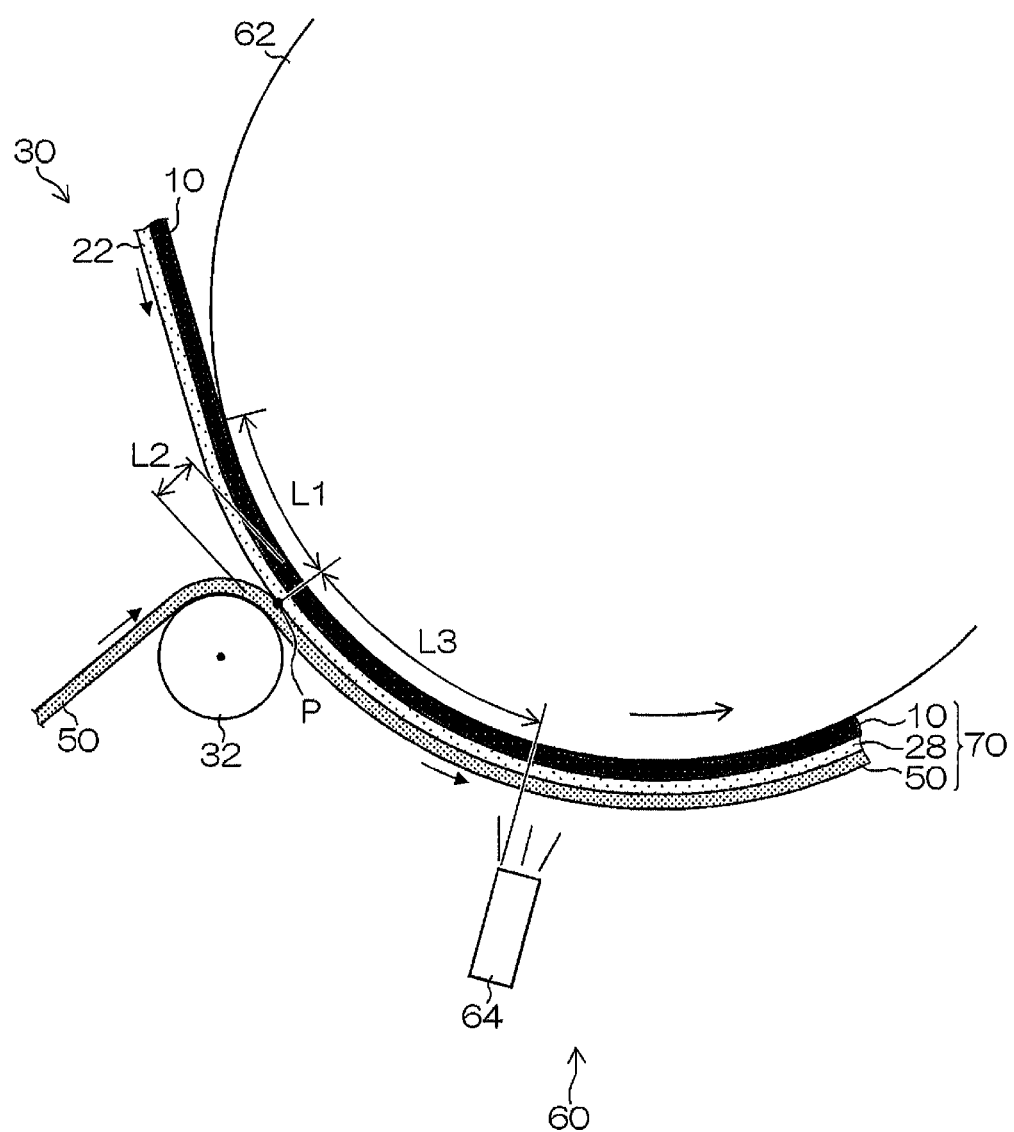
FIG. 4 is a partially enlarged view of the manufacturing apparatus shown in FIG. 3.

FIG. 3 shows a schematic configuration diagram of one example of a manufacturing apparatus 100 of the wavelength conversion member, and FIG. 4 shows a partially enlarged view of the manufacturing apparatus shown in FIG. 3. The production process of the wavelength conversion member by using the manufacturing apparatus 100 shown in FIGS. 3, 4 includes at least:

a step of forming a coating film by applying a polymerizable composition containing quantum dots on a surface of a first base material (hereinafter, also referred to as a "first film") which is continuously conveyed, a step of laminating (overlapping) on the coating film a second base material (hereinafter, also referred to as a "second film") which is continuously conveyed to sandwich the coating film by the first film and the second film, a step of taking up any one of the first film and the second film on a backup roller while maintaining the coating film sandwiched by the first film and the second film, and polymerizing and curing the coating film by irradiation of light while conveying the coating film continuously, to form a wavelength conversion layer (cured layer).

By using a barrier film having a barrier property against the oxygen and water as one of the first base material and the second base material, a wavelength conversion member which is protected on one side by the barrier film can be obtained. In addition, when using the barrier film as each of a first base material and the second base material, a wavelength conversion member where both sides of the wavelength conversion layer are protected by the barrier films can be obtained.

More specifically, first, a first film 10 is continuously conveyed from a feeding machine (not shown) to a coating portion 20. From the feeding machine, the first film 10 is fed out, for example, at a conveyance speed of 1 m/min to 50 m/min. However, the conveyance speed is not limited to the above speed. When being fed out, for example, a tension of 20 N/m to 150 N/m, preferably 30 N/m to 100 N/m is applied to the first film 10.

In the coating portion 20, the quantum dot-containing polymerizable composition (hereinafter, also referred to as a "coating liquid") is coated to the surface of the first film 10 to be continuously conveyed and thus a coating film 22 is formed (see FIG. 2). In the coating portion 20, for example, a die coater 24 and a backup roller 26 that is arranged opposite to the die coater 24 are provided. The surface of the first film 10 opposite to the surface on which the coating film 22 is formed is wound on the backup roller 26, and the coating liquid is applied from a discharge port of the die coater 24 to the surface of the first film 10 that is to be continuously conveyed and thus the coating film 22 is formed. Here, the coating film 22 is a quantum dot-containing composition before polymerization treatment, which is coated on the first film 10, In the present embodiment, the die coater 24 in which an extrusion coating method is used as a coating apparatus is illustrated, but the present invention is not limited thereto. For example, coating apparatuses in which various methods such as curtain coating method, extrusion coating method, rod coating method or role coating method are used can be used.

The first film 10 which passes through the coating portion 20 and on which the coating film 22 is formed is continuously conveyed to a laminating portion 30. In the laminating portion 30, a second film 50 which is continuously conveyed is laminated on the coating film 22 and thus the coating film 22 is sandwiched by the first film 10 and the second film 50.

In the laminating portion 30, a laminate roller 32 and a heating chamber 34 surrounding the laminate roller 32 are provided. The heating chamber 34 is provided with an opening 36 for the first film 10 to pass through and an opening 38 for the second film 50 to pass through.

A backup roller 62 is arranged at the position facing the laminate roller 32. The first film 10 on which the coating film 22 is formed is wound on the backup roller 62 at the surface opposite to the surface on which the coating film 22 is formed, and is continuously conveyed to a lamination position P. The lamination position P means a position where contact of the second film 50 with the coating film 22 starts. The first film 10 is preferably wound on the backup roller 62 before reaching the lamination position P. This is because, even if wrinkles are generated on the first film 10, the wrinkles can be corrected and removed by the backup roller 62 before the first film 10 reaches the lamination position P. Accordingly, a distance L1 from the point (contact position) where the first film 10 is wound on the backup roller 62 to the lamination position P is preferably long, for example, preferably 30 mm or more, and the upper limit is usually determined by a diameter of the backup roller 62 and a passing line.

According to the present embodiment, the lamination of the second film 50 is performed by the backup roller 62 used in a polymerization treatment portion 60 and the laminate roller 32. That is, the backup roller 62 used in the polymerization treatment portion 60 doubles as a roller in the laminating portion 30. However, the present invention is not limited to the above embodiment, and, a roller for lamination, which is not double as the backup roller 62, can be provided in the laminating portion 30 separately from the backup roller 62.

It is possible to reduce the number of rollers by using, in the laminating portion 30, the backup roller 62 used in the polymerization treatment portion 60. In addition, the backup roller 62 can also be used as a heat roller to the first film 10.

The second film 50 fed from the feeding machine which is not shown is wound on the laminate roller 32, and is continuously conveyed between the laminate roller 32 and the backup roller 62. The second film 50 is laminated on the coating film 22 formed on the first film 10 at the lamination position P. Thereby, the coating film 22 is sandwiched by the first film 10 and the second film 50. The term, laminate means stacking by overlapping the second film 50 on the coating film 22.

A distance L2 between the laminate roller 32 and the backup roller 62 is preferably a value of total thickness of the first film 10, the wavelength conversion layer (cured layer) 28 prepared by polymerizing and curing the coating film 22, and the second film 50, or more. L2 is preferably a length of total thickness of the first film 10, the coating film 22 and the second film 50 plus 5 mm, or shorter. When the distance L2 is the total thickness plus 5 mm or shorter, penetration of foam between the second film 50 and the coating film 22 can be prevented. The distance L2 between the laminate roller 32 and the backup roller 62 means the shortest distance from the outer peripheral surface of the laminate roller 32 and the outer peripheral surface of the backup roller 62.

A rotation accuracy of the laminate roller 32 and the backup roller 62 is equal to or less than 0.05 mm and, preferably equal to or less than 0.01 mm in a radian run-out. The smaller the radian run-out, the smaller the thickness distribution of the coating film 22 can be.

In order to inhibit the thermal deformation after sandwiching the coating film 22 by the first film 10 and the second film 50, a difference of a temperature of the backup roller 62 and a temperature of the first film 10 and a difference of a temperature of the backup roller 62 and a temperature of the second film 50 in the polymerization treatment portion 60 is preferably equal to or less than 30° C., more preferably equal to or less than 15° C., most preferably zero.

In order to make the difference from the temperature of the backup roller 62 smaller, when the heating chamber 34 is provided, it is preferable to heat the first film 10 and the second film 50 in the heating chamber 34. For example, a heated air can be supplied to the heating chamber 34 from a heated air generation device which is not shown to heat the first film 10 and the second film 50.

The first film 10 may be heated by the backup roller 62 by winding the first film 10 on the temperature-controlled backup roller 62.

On the other hand, with respect to the second film 50, by using the laminate roller 32 as a heating roller, the second film 50 can be heated by the laminate roller 32.

The heating chamber 34 and the heating roller are not essential, and may be provided as necessary.

Next, in a state where the coating film 22 is sandwiched by the first film 10 and the second film 50, the coating film 22 is continuously conveyed to the polymerization treatment portion 60. In the embodiment shown by the drawings, the polymerization treatment in the polymerization treatment portion 60 is performed by light irradiation, and in case where the polymerizable compound contained in the quantum dot-containing polymerizable composition is a compound which is polymerized by heating, the polymerization treatment can be performed by heating such as blowing of warm air.

The backup roller 62 and a light irradiation device 64 at the position facing the backup roller 62 are provided. The first film 10 and the second film 50 which sandwich the coating film 22 are continuously conveyed between the backup roller 62 and the light irradiation device 64. The light irradiated from the light irradiation device may be determined depending on the type of the photopolymerizable compound contained in the quantum dot-containing polymerizable composition, and one example includes an ultraviolet ray. Here, the ultraviolet ray means light having a wavelength of 280 nm to 400 nm. Examples of a usable light source generating the ultraviolet ray include a low-pressure mercury lamp, a middle-pressure mercury lamp, a high-pressure mercury lamp, a super high-pressure mercury lamp, a carbon arc lamp, a metal halide lamp, a xenon lamp, and the like. Irradiation energy may be set within the range that can progress the polymerization and curing of the coating film, and for example, as one example, ultraviolet ray at irradiation energy of 100 mJ/cm$^2$ to 10000 mJ/cm$^2$ can be irradiated to the coating film 22.

In the polymerization treatment portion 60, the first film 10 is wound on the backup roller 62 in a state where the coating film 22 is sandwiched by the first film 10 and the second film 50, and while continuously conveyed, the coating film 22 can be cured by light irradiation from the light irradiation device 64, to form the wavelength conversion layer (cured layer) 28.

In the present embodiment, the side of the first film 10 is wound on the backup roller 62 and continuously conveyed, but it is also possible that the second film 50 is wound on the backup roller 62 and continuously conveyed.

"Being wound on the backup roller 62" means a state where one of the first film 10 and the second film 50 is in contact with the surface of the backup roller 62 at a certain wrap angle. Accordingly, during continuous conveyance, the first film 10 and the second film 50 moves in synchronization with the rotation of the backup roller 62. The winding on the backup roller 62 may be kept at least during the ultraviolet ray irradiation.

The backup roller 62 is provided with a column-shaped main body and axes of rotation arranged at the both edges of the main body. The main body of the backup roller 62 has a diameter $\phi$ of, for example, 200 mm to 1000 mm. The diameter $\phi$ of the backup roller 62 is not limited. In consideration of the curl deformation, cost for equipment, and rotation accuracy, the diameter is preferably $\phi$300 mm to 500 mm. The temperature of the backup roller 62 can be regulated by attaching a temperature regulator to the main body of the backup roller 62.

The temperature of the backup roller 62 can be determined in consideration of the heat generation at the time of light irradiation, the curing efficiency of the coating film 22, the generation of the wrinkle deformation of the first film 10 and the second film 50 on the backup roller 62. The temperature of the backup roller 62 is preferably set within the range of 10° C. to 95° C., more preferably 15° C. to 85° C. Here, the temperature relating to the roller means a surface temperature of the roller.

A distance L3 between the lamination position P and the light irradiation device 64 can be, for example, equal to or more than 30 mm.

As a result of light irradiation, the coating film 22 serves as the cured layer 28 to thereby produce a wavelength conversion member 70 including the first film 10, the cured layer 28 and the second film 50. The wavelength conversion member 70 is peeled off from the backup roller 62 by a peeling roller 80. The wavelength conversion member 70 is continuously conveyed to a take-up machine which is not shown in the drawing, and then the wavelength conversion member 70 is wound in a form of roll by the take-up machine.

One embodiment of the manufacturing process of the wavelength conversion member has been explained above, but the present invention is not limited to the above embodiment. For example, a wavelength conversion layer (cured layer) may be produced by coating the quantum dot-containing composition on the base material and by performing the polymerization treatment after dry-treatment as necessary, without laminating the further base material thereon. One or more other layers can also be laminated on the produced wavelength conversion layer, by a known method.

The total thickness of the wavelength conversion layer is preferably within a range of 1 μm to 500 μm, more preferably within a range of 100 μm to 400 μm. The wavelength conversion layer may be two or more laminated structure, and may contain, in one layer, two or more types of quantum dots having different light emission properties. When the wavelength conversion layer is a laminated body composed of two or more layers, a thickness of one layer is preferably within a range of 1 μm to 300 μm, more preferably within a range of 10 μm to 250 μm, and further preferably within a range of 30 μm to 150 μm.

Other Layers, Base Material

The above-described wavelength conversion member may be a structure consisting of the wavelength conversion layer or may be a structure having a base material described further below in addition to the wavelength conversion layer. Alternatively, at least one surface of the wavelength conversion layer can have at least one layer selected from the group consisting of an inorganic layer and an organic layer. Such an inorganic layer and an organic layer can include an inorganic layer and an organic layer constituting a barrier film mentioned below. From the viewpoint of maintaining light emitting efficiency, each main surface of the wavelength conversion layer preferably includes at least one layer selected from the group consisting of an inorganic layer and an organic layer. This is because the contamination of oxygen from the main surfaces to the wavelength conversion layer can be prevented by the above layers. In addition, in an embodiment, the inorganic layer and the organic layer are preferably included as an adjacent layer which is directly in contact with a main surface of the wavelength conversion layer. Additionally, in another embodiment, a main surface of the wavelength conversion layer may be pasted to other layer via a known adhesive layer. In an embodiment, the whole surface of the wavelength conversion layer may be covered by a coating (namely, be sealed), but from the viewpoint of productivity, instead of covering the whole surface with a coating, it is preferable that the both main surfaces are protected by the other layer, preferably, the barrier film described below and the both sides are in a state of being exposed to atmosphere. Even in this state, the deterioration of the quantum dots by oxygen can be suppressed, because the wavelength conversion layer has low oxygen permeability.

(Base Material)

The wavelength conversion member may have a base material for enhancement of strength, ease of film formation, and the like. The base material may be directly in contact with the wavelength conversion layer. The wavelength conversion member may include one or two or more of the base materials, and the wavelength conversion member may have a structure in which the base material, the wavelength conversion member and the base material are laminated in this order. When the wavelength conversion member has two or more base materials, the base materials may be the same or different. The base material is preferably transparent at visible light. Here, being transparent at the visible light means that a light transmittance in a visible light region is equal to or more than 80%, preferably equal to or more than 85%. The light transmittance used as an index of transparency can be calculated in accordance with the method described in JIS-K 7105, that is, by measuring a whole light transmittance and scattered luminous energy through the use of an integrated sphere-type light transmittance measuring device, and by subtracting a diffusion transmittance from the whole light transmittance.

The thickness of the base material is preferably within a range of 10 µm to 500 µm, more preferably within a range of 20 µm to 400 µm, further preferably within a range of 30 µm to 300 µm, from the viewpoint of gas barrier properties and impact resistance.

The base material may be used as either or each of the above-described first film and the second film.

The base material may be the barrier film. The barrier film is a film having a gas barrier function of blocking oxygen molecules. The barrier film may also preferably have a function of blocking moisture.

The barrier film may usually include at least an inorganic layer, and may be a film containing a supporting film and the inorganic layer. As to the supporting film, for example, paragraphs 0046 to 0052 of JP2007-290369A, paragraphs 0040 to 0055 of JP2005-096108A can be referred to. The contents of the above publications are expressly incorporated herein by reference in their entirety. The barrier film may be a film which includes a barrier laminate having at least one inorganic layer and at least one organic layer, on the supporting film. Examples are a laminated structure of supporting film/organic layer/inorganic layer, a laminated structure of supporting film/inorganic layer/organic layer, supporting film/organic layer/inorganic layer/organic layer (here, the two organic layers may be the same or different in terms of either or both of thickness and composition), and the like. Since the barrier property can be further increased by laminating a plurality of layers in this way, but the light transmittance of the wavelength conversion member is tend to be decreased along with the increase in the number of laminated layers, it is desirable that the number of the laminated layers is increased within the range in which good light transmittance can be maintained. Specifically, the barrier film preferably has an oxygen permeability of equal to or less than 1 $cm^3/(m^2 \cdot day \cdot atm)$. Here, the above-described oxygen permeability is a value measured by using an oxygen gas permeability measuring device (OX-TRAN 2/20 Trade name: manufactured by MOCON) under the conditions of a measurement temperature 23° C. and a relative humidity 90%. The barrier film preferably has a whole light transmittance over a visible light region of equal to or more than 80%. The visible light region means a region with a wavelength of 380 nm to 780 nm, and the whole light transmittance shows a mean value of the light transmittances over the visible light region.

The oxygen permeability of the barrier film is more preferably equal to or less than 0.1 $cm^3/(m^2 \cdot day \cdot atm)$, further preferably equal to or less than 0.01 $cm^3/(m^2 \cdot day \cdot atm)$. The whole light transmittance in the visible light region is more preferably equal to or more than 90%. The lower the oxygen permeability is, the more preferable, and the higher the whole light transmittance in the visible light region is, the more preferable.

Inorganic Layer

The "inorganic layer" is a layer containing an inorganic material as a main component, and preferably is a layer formed only of an inorganic material. In contrast to this, the organic layer is a layer containing an organic material, and is a layer which contains an organic material in an amount of preferably equal to or more than 50% by weight, further preferably equal to or more than 80% by weight, and still further preferably equal to or more than 90% by weight.

The inorganic material constituting the inorganic layer is not particularly limited, and, for example, various inorganic compounds such as a metal, or an inorganic oxide, an inorganic nitride and an inorganic oxynitride can be used. Silicon, aluminum, magnesium, titanium, tin, indium and cerium are preferable as the element constituting the inorganic material, and one or two or more kinds thereof may be contained. Specific examples of the inorganic compound include silicon oxide, silicon oxynitride, aluminum oxide, magnesium oxide, titanium oxide, tin oxide, indium oxide alloy, silicon nitride, aluminum nitride, titanium nitride. In addition, a metal film such as aluminum film, silver film, tin film, chromium film, nickel film, titanium film may be provided as the inorganic layer.

Among the above-described materials, silicon nitride, silicon oxide, or silicon oxide nitride is particularly preferable. The reason is that since the inorganic layer formed of these materials has good adhesiveness to an organic layer, it is possible to further enhance the barrier property.

A method of forming the inorganic layer is not particularly limited, and various film forming methods that can accumulate a film forming material on a target surface for deposition by evaporating or scattering the material can be used, for example.

Examples of the method of forming the inorganic layer include a physical vapor deposition method such as a vacuum deposition method in which an inorganic material such as an inorganic oxide, an inorganic nitride, an inorganic oxynitride or metal is deposited by heating; an oxidation reaction deposition method in which an inorganic material is used as a raw material, and is oxidized by introducing an oxygen gas to thereby be deposited; a spattering method in which an inorganic material is used as a target material and is subjected to spattering by introducing an argon gas, an oxygen gas to thereby be deposited; or an ion-plating method in which an inorganic material is heated using a plasma beam generated by a plasma gun to thereby be deposited, and a plasma chemical vapor deposition method using an organic silicon compound as a raw material, and the like, in a film-forming of a deposition film of silicon oxide. The deposition may be carried out on a surface of a substrate such as a supporting film, a wavelength conversion layer or an organic layer.

The silicon oxide film is preferably formed by a low temperature plasma chemical vapor deposition method using an organic silicon compound as a raw material. Specific examples of the organic silicon compound can include, specifically, 1,1,3,3-tetramethyldisiloxane, hexamethydisiloxane, vinyltrimethylsilane, hexamethyldisilane, methylsilane, dimethylsilane, trimethylsilane, diethylesilane, propylsilane, phenylsilane, vinyltriethoxysilane, tetramethoxysilane, phenyltriethoxysilane, methyltriethoxysilane, octamethylcyclotetrasiloxane, and the like. In addition, among the above organic silicon compounds, it is preferable to use tetramethoxyxilane (TMOS) or hexamethyldisiloxane (HMDSO). This is because these are excellent in handling and in properties of deposition film.

The thickness of the inorganic layer is, for example, 1 nm to 500 nm, preferably 5 nm to 300 nm, and more preferably within a range of 10 nm to 150 nm. This is because, when the thickness of the inorganic layer is within the above-described range, reflection at the inorganic layer can be inhibited while achieving good barrier property, and thus a wavelength conversion member having a higher light transmittance can be provided.

In the wavelength conversion member, in an embodiment, at least one of the main surfaces of the wavelength conversion layer is preferably in direct contact with the inorganic layer. Each of the main surfaces of the wavelength conversion layer is also preferably in direct contact with the inorganic layer. In addition, in an embodiment, at least one of the main surfaces of the wavelength conversion layer is preferably in direct contact with the organic layer. Each of the main surfaces of the wavelength conversion layer is also preferably in direct contact with the organic layer. Here, the expression "main surface" means a surface (front surface, back surface) of the wavelength conversion layer which is arranged on the viewing side or the backlight side at the time of using the wavelength conversion member. The same also applies to the main surface of the other layer or member. The inorganic layer and the organic layer, two inorganic layers, or two organic layers may be stuck by using a known adhesive layer. From the viewpoint of enhancement of the light transmittance, the number of the adhesive layers is preferably small, and more preferably, no adhesive layer exists. In an embodiment, the inorganic layer is preferably in direct contact with the organic layer.

Organic Layer

With respect to the organic layer, paragraphs 0020 to 0042 of JP2007-290369A, paragraphs 0074 to 0105 of JP2005-096108A can be referred to. In an embodiment, the organic layer preferably contains a cardo polymer. This is because adhesion property to the layer adjacent to the organic layer, especially adhesion property to the inorganic layer becomes good, and thus more excellent gas barrier property can be achieved. Details of the cardo polymer can be referred to paragraphs 0085 to 0095 of JP2005-096108A. The thickness of the organic layer is preferably within a range of 0.05 μm to 10 μm, more preferably within a range of 0.5 μm to 10 μm. When the organic layer is formed by a wet coating method, the thickness of the organic layer is preferably within a range of 0.5 μm to 10 μm, more preferably within a range of 1 μm to 5 μm. When the organic layer is formed by a dry coating method, the thickness is preferably within a range of 0.05 μm to 5 μm, particularly preferably within a range of 0.05 μm to 1 μm. This is because, when the thickness of the organic layer formed by the wet coating method or the dry coating method is within the above range, the adhesion property to the inorganic layer can be made better.

In the present invention and the description, a polymer refers to a polymer obtained by polymerizing the same or different two or more compounds through polymerization reaction, and the expression "polymer" is used in a meaning including an oligomer, and the molecular weight is not particularly limited. In addition, the polymer may be a polymer having a polymerizable group and can be further polymerized by being subjected to a polymerization treatment such as heating or light irradiation, depending on kinds of polymerizable group. The above-described polymerizable compound such as the epoxy compound, the monofunctional (meth)acrylate compound and the polyfunctional (meth)acrylate compound may correspond to the polymer having the above meaning.

In addition, the organic layer can be a cured layer formed by curing the polymerizable composition containing a (meth)acrylate polymer. The (meth)acrylate polymer is a polymer containing one or more (meth)acryloyl groups in one molecule. Examples of the (meth)acrylate polymer used for forming the organic layer can include is a (meth) acrylate polymer containing one or more urethane bonds in one molecule. Hereinafter, the (meth)acrylate polymer containing one or more urethane bonds in one molecule will be described as the urethane bond-containing (meth)acrylate polymer. When the barrier layer includes two or more organic layers, a cured layer formed by curing a polymerizable composition containing the urethane bond-containing (meth)acrylate polymer and other organic layer may be included. According to one aspect, the organic layer which is in direct contact with either or each of the main surfaces of the wavelength conversion layer is preferably the cured layer formed by curing a polymerizable composition containing the urethane bond-containing (meth)acrylate polymer.

In an embodiment of the urethane bond-containing (meth)acrylate polymer, a structural unit having an urethane bond is introduced to the side chain of the polymer. Hereinafter, a main chain to which the structural unit having a urethane bond is introduced will be described as the acryl main chain.

In addition, a (meth)acryloyl group is preferably contained at at least one terminal of the side chain having an urethane bond. More preferably, every side chain having an urethane bond contains (meth)acryloyl group. Further preferably, the (meth)acryloyl group contained at the terminal is an acryloyl group.

The urethane bond-containing (meth)acrylate polymer can be generally obtained by a graft-copolymerization, but is not particularly limited. The acryl main chain may be directly bonded to the structural unit having the urethane bond or may be bonded via a linkage group. Examples of the linkage group include ethylene oxide group, polyethylene oxide group, propylene oxide group, and polypropylene oxide group, and the like. The urethane bond-containing (meth)acrylate polymer may contain a plurality of kinds of side chain in which the structural units having urethane bond are bonded together via a different linkage group (including direct bond).

The urethane bond-containing (meth)acrylate polymer may have a side chain other than the structural unit having a urethane bond. An example of the other side chain is a linear or branched alkyl group. The linear or branched alkyl group is preferably a linear alkyl group with 1 to 6 carbon atoms, more preferably n-propyl group, ethyl group, or methyl group, and further preferably methyl group. In addition, the other side chain may contain other structure. This point also applies to the structural unit having a urethane bond.

The number of each of urethane bonds and (meth)acryloyl groups which are contained in one molecule of the urethane bond-containing (meth)acrylate polymer is one or more, preferably two or more, but is not particularly limited. The weight-average molecular weight of the urethane bond-containing (meth)acrylate polymer is preferably equal to or more than 10,000, more preferably equal to or more than 12,000, and further preferably equal to or more than 15,000. Furthermore, the weight-average molecular weight of the urethane bond-containing (meth)acrylate polymer is preferably equal to or less than 1,000,000, more preferably equal to or less than 500,000, and further preferably equal to or less than 300,000. The acryl equivalent of the urethane bond-containing (meth)acrylate polymer is preferably equal to or more than 500, more preferably equal to or more than 600, and further preferably equal to or more than 700; and the acryl equivalent is preferably equal to or less than 5,000, more preferably equal to or less than 3,000, and further preferably equal to or less than 2,000. The acryl equivalent is a value obtained by dividing the weight-average molecular weight by the number of the (meth)acryloyl groups per one molecule.

As the urethane bond-containing (meth)acrylate polymer, a polymer synthesized by a known method may be used, or a commercially available product may be used. Example of the commercially available product can include a UV curable acryl-urethane polymer (8BR series) manufactured by TAISEI Fine Chemical Co., Ltd. The urethane bond-containing (meth)acrylate polymer is preferably contained in an amount of 5 to 90% by weight relative to total solid content 100% by weight of the polymerizable composition for forming an organic layer, more preferably 10 to 80% by weight.

In the curable compound for forming an organic layer, one or more of the urethane bond-containing (meth)acrylate polymer and one or more of other polymerizable compound may be used together. As the other polymerizable compound, a compound having an ethylenic unsaturated bond at the terminal or side chain is preferable. Examples of the compound having the ethylenic unsaturated bond at the terminal or side chain include a (meth)acrylate compound, an acrylamide-based compound, a styrene-based compound, maleic anhydride, and the like; preferably a (meth)acrylate compound, more preferably an acrylate compound.

As the (meth)acrylate compound, (meth)acrylate, polyester (meth)acrylate, epoxy (meth)acrylate, and the like are preferable. Examples of the (meth)acrylate compound can include the compounds described in paragraphs 0024 to 0036 of JP 2013-43382A, or paragraphs 0036 to 0048 of JP 2013-43384A. The contents of the above publications are expressly incorporated herein by reference in their entirety Styrene, α-methylstyrene, 4-methylstyrene, divinylbenzene, 4-hydroxystyrene, 4-caroxystyrene, and the like are preferable as the styrene compound.

The polymerizable composition for forming an organic layer can also contain a known additive together with one or more polymerizable compounds. Example of such an additive can include an organic metal coupling agent. For details, the above description can be referred to. The organic metal coupling agent is preferably contained in an amount of 0.1 to 30% by weight, more preferably 1 to 20% by weight, provided that the total solid content of the polymerizable composition used for forming an organic layer is set as 100% by weight.

In addition, an example of the additive includes a polymerization initiator. When the polymerization initiator is used, the content of the polymerization initiator in the polymerizable composition is preferably equal to or more than 0.1 mole %, more preferably 0.5 to 5 mole % relative to the total amount of the polymerizable compounds. Examples of the polymerization initiator include Irgacure series manufactured by BASF (for example, Irgacure 651, Irgacure 754, Irgacure 184, Irgacure 2959, Irgacure 907, Irgacure 369, Irgacure 379, Irgacure 819, etc.), Darocure series (for example, Darocure TPO, Darocure 1173, etc.), Quantacure PDO, Ezacure series manufactured by Lamberti (for example, Ezacure TZM, Ezacure TZT, Ezacure KTO46, etc.), and the like.

The curing of the polymerizable composition for forming the organic layer can be performed by treatment (light irradiation, heating, and the like) appropriate to the type of the components (polymerizable compound, polymerization initiator) contained in the polymerizable composition. The curing conditions are not particularly limited, and can be set depending on the type of the components contained in the polymerizable composition and thickness of the organic layer, and the like.

For other details of the inorganic layer and the organic layer, the descriptions of JP 2007-290369A, JP2005-096108A, and further US 2012/0113672A1, which are expressly incorporated herein by reference in their entirety, can be referred to.

The inorganic layer and the organic layer, two organic layers, or two inorganic layers, may be stuck using an adhesive layer. From the viewpoint of enhancement of the light transmittance, the number of the adhesive layers is preferably small, and more preferably, there is no adhesive layer.

Backlight Unit

The backlight unit according to an aspect of the present invention includes at least the above wavelength conversion member and a light source. Details of the wavelength conversion member are as described above.

Light Emission Wavelength of Backlight Unit

From the viewpoint of achieving high brightness and high color reproducibility, it is preferable to use a backlight unit having a multi wavelength light source. Preferred embodiment is a backlight unit which emits;
blue light having an emission center wavelength within a wavelength range of 430 nm to 480 nm and having an emission intensity peak with a half width of equal to or less than 100 nm, green light having an emission center wavelength within a wavelength range of 500 nm to 600 nm and having an emission intensity peak with a half width of equal to or less than 100 nm, red light having an emission center wavelength within a wavelength range of 600 nm to 680 nm and having an emission intensity peak with a half width of equal to or less than 100 nm.

From the viewpoint of further enhancement of the high brightness and high color reproducibility, the wavelength range of the blue light which is emitted from the backlight unit is preferably within a range of 440 nm to 480 nm, more preferably within a range of 440 nm to 460 nm.

From the same viewpoint, the wavelength range of the green light which is emitted from the backlight unit is preferably within a range of 510 nm to 560 nm, more preferably within a range of 510 nm to 545 nm.

In addition, from the same viewpoint, the wavelength range of the red light which is emitted from the backlight unit is preferably within a range of 600 nm to 650 nm, more preferably within a range of 610 nm to 640 nm.

Additionally, from the same viewpoint, the half width of the emission intensity of the blue light, the green light and the red light which is emitted from the backlight unit is preferably equal to or less than 80 nm, more preferably equal to or less than 50 nm, further preferably equal to or less than 40 nm, and still further preferably equal to or less than 30 nm. Among them, the half width of the emission intensity of the blue light is particularly preferably equal to or less than 25 nm.

The backlight unit includes at least the light source together with the above wavelength conversion member. In an embodiment, a blue light source having an emission center wavelength within a wavelength range of 430 nm to 480 nm as the light source, for example, a blue light-emitting diode which emits a blue light can be used. When using the light source emitting blue light, the wavelength conversion layer preferably contains at least the quantum dot A which is excited with exciting light to emit red light, and the quantum dot B which emits green light. Thereby, white light can be yielded by the blue light emitted from the light source and passing through the wavelength conversion member, and the red light and the green light emitted from the wavelength conversion member.

Alternatively, in an embodiment, a light source emitting ultraviolet ray having an emission center wavelength within a wavelength range of 300 nm to 430 nm, for example, an ultraviolet ray-emitting diode can be used as the light source. In this case, the wavelength conversion layer preferably contains the quantum dot C which is excited with exciting light to emit blue light, together with the quantum dots A and B. Thereby, white light can be yielded by the red light, the green light and the blue light emitted from the wavelength conversion member.

Furthermore, in an embodiment, the light-emitting diode can be replaced by a laser source.

Configuration of Backlight Unit

The configuration of the backlight unit may be an edge light system using a light guide plate and a reflective plate as constituent members, and a direct under type system. FIG. 1 shows a backlight unit of the edge light system as one embodiment. A known plate can be used as the light guide plate, without any limitation.

Furthermore, the backlight unit may be provided with a reflective member in the rear of the light source. Such a reflective member is not particularly limited and a known member, which is described in JP3416302B, JP3363565B, JP4091978B, JP3448626B, or the like, can be used. The contents of the above publications are expressly incorporated herein by reference in their entirety.

The backlight unit is preferably provided with other known diffusion plate, a diffusion sheet, a prism sheet (for example, BEF series manufactured by SUMITOMO 3M), a light guide device. The other members are also described in the publications of JP3416302 B, JP3363565B, JP4091978B, JP3448626B. The contents of the above publications are expressly incorporated herein by reference in their entirety.

Liquid Crystal Display Device

The liquid crystal display device according to an aspect of the present invention includes at least the above backlight unit and a liquid crystal cell.

Configuration of Liquid Crystal Display Device

The driving mode of the liquid crystal cell is not particularly limited, and various modes such as twisted nematic (TN), super twisted nematic (STN), vertical alignment (VA), in-play-switching (IPS), and optically compensated bend cell (OCB) can be utilized. The liquid crystal cell is preferably VA mode, OCB mode, IPS mode or TN mode, but is not particularly limited thereto. One example of the configuration of the liquid crystal cell of VA mode is the configuration shown in FIG. 2 of JP 2008-262161 A, which is expressly incorporated herein by reference in its entirety. However, the specific configuration of the liquid crystal display device is not particularly limited, and a known configuration can be adopted.

One embodiment of the liquid crystal display device has a configuration in which the device includes a liquid crystal cell having a liquid crystal layer sandwiched between two opposing substrates at least one of which is provided with an electrode, and in which the liquid crystal cell is arranged between two polarizing plates. The liquid crystal display device has a liquid crystal cell where a liquid crystal is sealed between the upper and lower substrates and displays an image by changing a state of orientation of the liquid crystal through applying a voltage. Furthermore, as necessary, the device includes additional functional layers such as a polarizing plate protective film, an optically compensatory member which can perform optical compensation, and an adhesive layer. In addition, there may be arranged a color filter substrate, a thin layered transistor substrate, a lens film, a diffusion sheet, a hard coating layer, an antireflective layer, a low reflective layer, an antiglare layer, etc. and together (or instead thereof), a surface layer such as a forward scattering layer, a primer layer, an antistatic layer, or an under coating layer.

Figure 2:
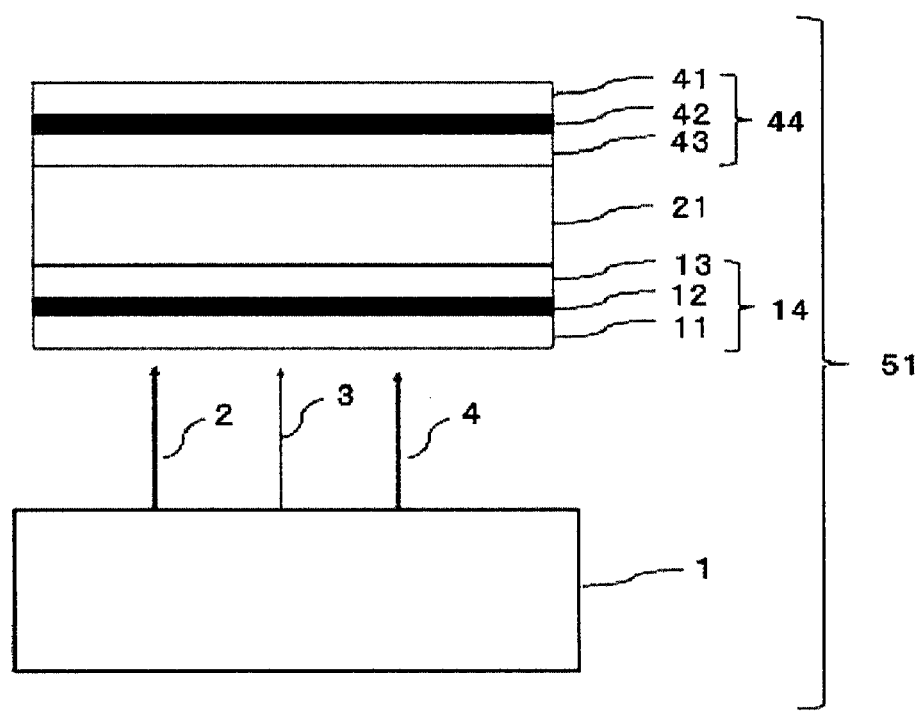
FIG. 2 shows one example of a liquid crystal display device according to an aspect of the present invention.

FIG. 2 shows one example of the liquid crystal display device according to an aspect of the present invention. The liquid crystal display device 51 shown in FIG. 2 has a backlight-side polarizing plate 14 on the surface of the backlight-side of the liquid crystal cell 21. The backlight side polarizing plate 14 may or may not include a polarizing plate protective film 11 on the surface of the backlight side of a backlight side polarizer 12, and preferably may include the protective film 11.

The backlight side polarizing plate 14 preferably has a configuration in which the polarizer 12 is sandwiched by the two polarizing plate protective films 11 and 13.

In the description, a polarizing plate protective film close to the liquid crystal cell with respect to the polarizer is referred to as an inner-side polarizing plate protective film, and a polarizing plate protective film apart from the liquid crystal cell with respect to the polarizer is referred to as an outer-side polarizing plate protective film. In the example shown in FIG. 2, the polarizing plate protective film 13 is the inner-side polarizing plate protective film, and the polarizing plate protective film 11 is the outer-side polarizing plate protective film.

The backlight-side polarizing plate may have a retardation film as an inner-side polarizing plate protective film on the liquid crystal cell side. A known cellulose acylate film can be used as such a retardation film.

The liquid crystal display device 51 has a display-side polarizing plate 44 on the surface opposite to the surface of the backlight side of the liquid crystal cell 21. The display-side polarizing plate 44 has a configuration in which a polarizer 42 is sandwiched by two polarizing plate protective films 41 and 43. The polarizing plate protective film 43 is the inner-side polarizing plate protective film, and the polarizing plate protective film 41 is the outer-side polarizing plate protective film.

The backlight unit 1 that the liquid crystal display device 51 has is as described above.

The liquid crystal cell, the polarizing plate, the polarizing plate protective film, and the like constituting the liquid crystal display device according to an aspect of the present invention are not particularly limited, and it is possible to use any one produced by a known method and a commercially available product without any limitation. In addition, a known medium layer such as an adhesive layer can be provided between the layers.

Since the liquid crystal display device according to an aspect of the present invention as explained above has the backlight unit including the wavelength conversion member, the device can realize high brightness and high color reproducibility for a long period of time.

EXAMPLES

The present invention will be more specifically explained on the basis of Examples below. The material, amount used, proportion, treatments, treating procedure, and the like shown in the following Examples can be appropriately modified as long as the modifications thereof do not depart from the gist of the present invention. Accordingly, the scope of the present invention should not be interpreted limitedly by the following Examples.

Example 1

1. Production of Barrier Film 10

An organic layer and an inorganic layer were formed on one surface side of a polyethylene terephtalate film (PET film, manufactured by TOYOBO Co., Ltd., Trade name: Cosmoshine (Japanese registered Trademark A4300, 50 μm thickness) in the following procedures.

A coating liquid having a solid content of 15% by weight was obtained by weighting trimethylolpropane triacrylate (TMPTA manufactured by DAICEL CYTEC) and a photopolymerization initiator (ESACURE KTO46, manufactured by Lambeth) in a weight ratio of the former:the latter=95:5, and by dissolving these compounds in methyl ethyl ketone. The coating liquid was coated on the above PET film by using a die coater in a roll-to-roll process, and was then made to pass through a drying zone of 50° C. for 3 minutes. After that, ultraviolet curing was carried out by irradiating the resultant coated material with ultraviolet ray (accumulated dosage: about 600 mJ/cm$^2$) under a nitrogen atmosphere, and then the coated material was wound. The thickness of the first organic layer formed on the supporting film was 1 μm.

Next, an inorganic layer (silicon nitride layer) was formed on the surface of the first organic layer by using a roll-to-roll type CVD (Chemical Vapor Deposition) device. The raw material gases used were silane gas (flow rate 160 sccm), ammonia gas (flow rate 370 sccm), hydrogen gas (flow rate 590 sccm), and nitrogen gas (flow rate 240 sccm). A power source of high frequency of 13.56 MHz frequency was used as a power source. A pressure for film forming was 40 Pa, and an achieved thickness was 50 nm. In this way, a bather film 10 in which the inorganic layer was laminated on the first organic layer was produced.

2. Preparation of Composition for Forming Wavelength Conversion Layer (Quantum Dot-Containing Polymerizable Composition)

The following quantum dot dispersion A was prepared as the quantum dot-containing polymerizable composition, and after filtration with a filter of polypropylene having a pore size of 0.2 μm and then drying under a reduced pressure for 30 minutes, the resultant dispersion A was used as a coating liquid. The quantum dot concentration in the following toluene dispersion was 1% by weight.

| Quantum dot dispersion A | |
|---|---|
| Toluene dispersion of quantum dot 1 (maximum emission: 530 nm) Quantum dot 1: INP530-10 (manufactured by NN-labs) | 10.0 parts by weight |
| Toluene dispersion of quantum dot 2 (maximum emission: 620 nm) Quantum dot 2: INP620-10 (manufactured by NN-labs) | 1.0 part by weight |
| Monofunctional methacrylate compound 1 (lauryl methacrylate) | 99.0 parts by weight |
| Oxygen permeability coefficient-reducing agent 1 | 10.011 parts by weight |
| Photo radical polymerization initiator (IRGACURE (Japanese registered trademark) 819 manufactured by BASF) | 1.0 part by weight |

Oxygen Permeability Coefficient-Reducing Agent 1

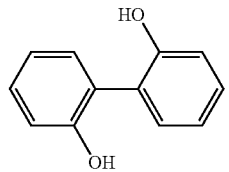

3. Production of Wavelength Conversion Member A

The wavelength conversion member A was obtained by using the barrier film 10 produced in the above-described procedures as a first and the second film, through the production processes explained by referring to FIG. 3 and FIG. 4. Specifically, while continuously conveying the barrier film 10 that has been prepared as the first film at 1 m/min, under a tension of 60 N/m, the quantum dot-containing polymerizable composition was coated by a die coater on the surface of the inorganic layer to form a coating film having a thickness of 50 μm. Subsequently, the barrier film 10 on which the coating film was formed was wound on a backup roller, another barrier film 10 was laminated on the coating film as the second film in a direction in which the surface of the inorganic layer was in contact with the coating film, and thereafter, was wound on the backup roller in a state where the coating film was sandwiched by the two barrier films 10 (the first and second films), and then the barrier film 10 was irradiated with ultraviolet ray while performing continuous conveyance. A diameter of the backup roller was ϕ300 mm, and a temperature of the backup roller was 50° C. A dosage of ultraviolet ray was 2000 mJ/cm². In addition, L1 was 50 mm, L2 was 1 mm, and L3 was 50 mm.

A cured layer (wavelength conversion layer) was formed by curing the coating film by the above-described ultraviolet ray irradiation and thus the wavelength conversion member A was produced. The cured layer of the wavelength conversion member has a thickness of about 50 μm. The wavelength conversion member A in which the barrier films 10 were provided on each of both main surfaces of the wavelength conversion layer and the both main surfaces of the wavelength conversion layer were in direct contact with the inorganic layer of the barrier film was thus obtained.

Example 2

A wavelength conversion member B was produced in the same way as in Example 1 except that the oxygen permeability coefficient-reducing agent 1 of the quantum dot dispersion A in Example 1 was changed to the following oxygen permeability coefficient-reducing agent 2.

Oxygen Permeability Coefficient-Reducing Agent 2

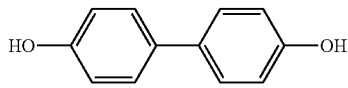

Example 3

A wavelength conversion member C was produced in the same way as in Example 1 except that the oxygen permeability coefficient-reducing agent 1 of the quantum dot dispersion A in Example 1 was changed to the following oxygen permeability coefficient-reducing agent 3.

Oxygen Permeability Coefficient-Reducing Agent 3

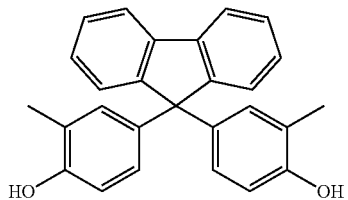 [SMILES: Cc1cc(C2(c3ccc(O)c(C)c3)c3ccccc3-c3ccccc32)ccc1O]

Example 4

A wavelength conversion member D was produced in the same way as in Example 1 except that the oxygen permeability coefficient-reducing agent 1 of the quantum dot dispersion A in Example 1 was changed to the following oxygen permeability coefficient-reducing agent 4.

Oxygen Permeability Coefficient-Reducing Agent 4

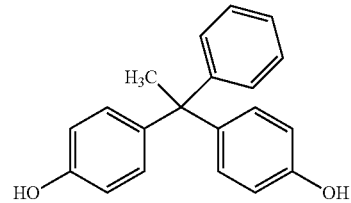 [SMILES: CC(c1ccccc1)(c1ccc(O)cc1)c1ccc(O)cc1]

Example 5

A wavelength conversion member E was produced in the same way as in Example 1 except that the oxygen permeability coefficient-reducing agent 1 of the quantum dot dispersion A in Example 1 was changed to the following oxygen permeability coefficient-reducing agent 5.

Oxygen Permeability Coefficient-Reducing Agent 5

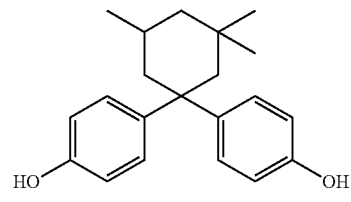 [SMILES: CC1CC(C)(C)CC(c2ccc(O)cc2)(c2ccc(O)cc2)C1]

Example 6

1. Production of Barrier Film 11

The second organic layer was laminated on the surface of the inorganic layer of the above-described barrier film 10.

A coating liquid having a solid content of 15% by weight was prepared by weighting an urethane bond-containing acryl polymer (Acrit 8BR500 manufactured by TAISEI Fine Chemical, weight-average molecular weight 250,000) and a photopolymerization initiator (IRGACUR 184 manufactured by BASF) in a weight ratio of 95:5, and by dissolving these compounds in methyl ethyl ketone. The surface of the inorganic layer of the above-described barrier film 10 was coated with the thus prepared coating liquid by using a die coater in a roll-to-roll process, and was then made to pass through a drying zone of 100° C. for 3 minutes, and the coated material was wound. The thickness of the second organic layer thus formed was 1 μm. In this way, the barrier film 11 obtained by laminating the inorganic layer on the surface of the first organic layer and by further laminating the second organic layer thereon was produced.

2. Production of Wavelength Conversion Member F

The wavelength conversion member F was obtained by using the barrier film 11 produced according to the above-described procedures as the first and second films and through the production steps explained by referring FIG. 3 and FIG. 4. Specifically, while continuously conveying the barrier film 11 that has been prepared as the first film at 1 m/min and under a tension of 60 N/m, the quantum dot-containing polymerizable composition (quantum dot dispersion A) which was the same as in Example 1 was coated by a die coater on the surface of the second organic layer to form a coating film of 50 µm thickness. Subsequently, the barrier film 11 on which the coating film was formed was wound on a backup roller, another barrier film 11 was laminated, as the second film, on the coating film in the direction in which the surface of the second organic layer was in contact with the coating film, and thereafter, was wound on the backup roller in a state where the coating film was sandwiched by the two barrier films 11 (the first and second films), and then irradiation with ultraviolet ray was performed while carrying out continuous conveyance. A diameter of the backup roller was φ300 mm, and a temperature of the backup roller was 50° C. A dosage of the ultraviolet ray was 2000 mJ/cm$^2$. In addition, L1 was 50 mm, L2 was 1 mm, and L3 was 50 mm.

A cured layer (wavelength conversion layer) was formed by curing the coating layer by the above-described ultraviolet ray irradiation, with the result that the wavelength conversion member F was produced. The cured layer of the wavelength conversion member has a thickness of about 50 µm. Accordingly, the wavelength conversion member F was obtained in which the barrier films 11 were provided on each of both main surfaces of the wavelength conversion layer, and the both main surfaces of the wavelength conversion layer were in direct contact with the second organic layer of the barrier film.

Example 7

A wavelength conversion member G was produced in the same way as in Example 6 except that the quantum dot dispersion A was changed to the following quantum dot dispersion G.

| Quantum dot dispersion G | |
| --- | --- |
| Toluene dispersion of quantum dot 3 (maximum emission: 530 nm) Quantum dot 3: CZ520-10 manufactured by NN-labs | 10.0 parts by weight |
| Toluene dispersion of quantum dot 4 (maximum emission: 620 nm) Quantum dot 4: CZ620-10 manufactured by NN-labs | 1.0 part by weight |
| Monofunctional methacrylate compound 1 (lauryl methacrylate) | 99.0 parts by weight |
| Oxygen permeability coefficient-reducing agent 1 | 10.011 parts by weight |
| Photo radical polymerization initiator (IRGACURE 819 manufactured by BASF) | 1.0 part by weight |

Example 8

A wavelength conversion member H was produced in the same way as in Example 6 except that the quantum dot dispersion A was changed to the following quantum dot dispersion H. The toluene dispersions of the following quantum dots 1 and 2 were the same as those used in the quantum dot dispersion A.

| Quantum dot dispersion H | |
| --- | --- |
| Toluene dispersion of quantum dot 1 (maximum emission: 530 nm) Quantum dot 1: INP530-10 manufactured by NN-labs | 10.0 parts by weight |
| Toluene dispersion of quantum dot 2 (maximum emission: 620 nm) Quantum dot 2: INP620-10 manufactured by NN-labs | 1.0 part by weight |
| Monofunctional methacrylate compound 1 (lauryl methacrylate) | 94.0 parts by weight |
| Oxygen permeability coefficient-reducing agent 1 | 10.111 parts by weight |
| Light scattering particle (ST-710EC manufactured by Titan Kogyo, average particle size 0.30 µm) | 5.0 parts by weight |
| Photo radical polymerization initiator (IRGACURE 819 manufactured by BASF) | 1.0 part by weight |

Example 9

A wavelength conversion member J was produced in the same way as in Example 1 except that the quantum dot dispersion A was changed to the following quantum dot dispersion J. The toluene dispersions of the following quantum dots 1 and 2 were the same as those used in the quantum dot dispersion A.

| Quantum dot dispersion J | |
| --- | --- |
| Toluene dispersion of quantum dot 1 (maximum emission: 530 nm) Quantum dot 1: INP530-10 manufactured by NN-labs | 10.0 parts by weight |
| Toluene dispersion of quantum dot 2 (maximum emission: 620 nm) Quantum dot 2: INP620-10 manufactured by NN-labs | 1.0 part by weight |
| Monofunctional methacrylate compound 1 (lauryl methacrylate) | 66.0 parts by weight |
| Polyfunctional (trifunctional) acrylate compound (TMPTA manufactured by DAICEL CYTEC) | 33.0 parts by weight |
| Oxygen permeability coefficient-reducing agent 1 | 10.011 parts by weight |
| Photo radical polymerization initiator (IRGACURE 819 manufactured by BASF) | 1.0 part by weight |

Example 10

A wavelength conversion member L was produced in the same way as in Example 1 except that the quantum dot dispersion A was changed to the following quantum dot dispersion L. The toluene dispersions of the following quantum dots 1 and 2 were the same as those used in the quantum dot dispersion A.

| Quantum dot dispersion L | |
| --- | --- |
| Toluene dispersion of quantum dot 1 (maximum emission: 530 nm) Quantum dot 1: INP530-10 manufactured by NN-labs | 10.0 parts by weight |
| Toluene dispersion of quantum dot 2 (maximum emission: 620 nm) Quantum dot 2: INP620-10 manufactured by NN-labs | 1.0 part by weight |
| Monofunctional methacrylate compound 1 (lauryl methacrylate) | 63.0 parts by weight |
| Epoxy compound (CELLOXIDE2021P manufactured by DAICEL) | 33.0 parts by weight |

-continued

| Quantum dot dispersion L | |
|---|---|
| Oxygen permeability coefficient-reducing agent 1 | 10.011 parts by weight |
| Photo radical polymerization initiator (IRGACURE 819 manufactured by BASF) | 1.0 part by weight |
| Photo cationic polymerization initiator (CPI-100P manufactured by San-Apro) | 3.0 parts by weight |

Comparative Example 1

A wavelength conversion member I was produced in the same way as in Example 1 except that the oxygen permeability coefficient-reducing agent 1 was not used.

Comparative Example 2

A wavelength conversion member K was produced in the same way as in Example 7 except that the oxygen permeability coefficient-reducing agent 1 was not used.

Comparative Example 3

A wavelength conversion member M was produced in the same way as in Example 8 except that the oxygen permeability coefficient-reducing agent 1 was not used.

Comparative Example 4

A wavelength conversion member N was produced in the same way as in Example 9 except that the oxygen permeability coefficient-reducing agent 1 was not used.

Comparative Example 5

A wavelength conversion member O was produced in the same way as in Example 10 except that the oxygen permeability coefficient-reducing agent 1 was not used.

Evaluation of Brightness Change at Edge

1. Evaluation of Initial (Before Continuous Irradiation) Brightness

A commercially available tablet terminal (Kindle (Japanese registered trademark) Fire HDX 7" manufactured by Amazon) was disassembled and thus a backlight unit was taken out. The wavelength conversion member A to O which was cut into a rectangular shape was placed on the light guide plate of the backlight taken out, and thereon, two prism sheets arranged so as to cross orthogonally were piled up. A brightness of light which was emitted from a blue light source and passed through the wavelength conversion member and the two prism sheets was measured by a luminance meter (SR3 manufactured by TOPCON) set at a position apart from 740 mm in the vertical direction relative to the surface of the light guide plate. The measurement was carried out at the position (edge portion) entered inward by 5 mm from the corner of the side surface side of the wavelength conversion member, and the average value (Y0) of the measured values at the four corners was used as an evaluation value.

2. Evaluation of Brightness Before and after Continuous Irradiation

In a room where a temperature was kept at 25° C. and a relative humidity was kept at 60%, each of the wavelength conversion members was placed on a commercially available blue light source (OPSM-H150X142B manufactured by OPTEX-FA Co., Ltd.), and the wavelength conversion member was continuously irradiated with blue light for 100 hours.

After continuous irradiation, the brightnesses (Y1) at the above-described four corners of the wavelength conversion member were measured in the same way as in the above-described 1. for the evaluation of brightness before continuous irradiation. The difference rate ($\Delta Y$) from the initial brightness value was calculated as an index of brightness change from the following equation.

$$\Delta Y[\%]=(Y0-Y1)/Y0\times 100$$

By using the obtained value of $\Delta Y$, the brightness change at the edge was evaluated on the basis of the following standard. When the evaluation results are A and B, it is possible to determine that the light emission efficiency at the edge can be maintained good even after the continuous irradiation.

(Evaluation Standard)
AA $\Delta Y \leq 10\%$
A $10\% < \Delta Y \leq 20\%$
B $20\% < \Delta Y < 40\%$
C $40\% \leq \Delta Y < 60\%$
D $60\% \leq \Delta Y$ Evaluation of Oxygen Permeability Coefficient of Wavelength Conversion Layer An oxygen permeability coefficient of wavelength conversion layer prepared in Example and Comparative Example which was converted to 1 mm thickness was evaluated according to the following manner Samples for measuring oxygen permeability coefficient were produced according to the following procedures.

A film with a wavelength conversion layer having a thickness of 50 µm was formed by coating, to a supporting film (TD80UL manufactured by FUJIFILM), the quantum dot dispersion used in Example and Comparative Example prepared in the above-described procedures, by using a wire bar, and by irradiating the coating surface with ultraviolet ray through the use of an air-cooling metal halide lamp of 1200 W/cm (manufactured by HachUltra) while purging nitrogen for curing. Subsequently, an oxygen permeability coefficient (P0) of the film with a wavelength conversion layer was converted from an equilibrium oxygen concentration value measured by sticking the film with a wavelength conversion layer on a detecting portion of an oximeter manufactured by ORBIS Fair Laboratory via silicone grease. According to the same way, an oxygen permeability coefficient (P1) of the supporting film itself was measured, and an oxygen permeability coefficient (P) per 1 mm thickness of each wavelength conversion layer was calculated according to the following equation. The calculated values are shown in the following tables. The values calculated in this way are shown in the following tables as an oxygen permeability coefficient per 1 mm thickness of each wavelength conversion layer contained in each wavelength conversion member.

$$P = T/((T0/P0)-(T1/P1))$$

[In the above equation, T represents a thickness of a wavelength conversion layer, T0 represents a thickness of a film with a wavelength conversion layer, T1 represents a thickness of a supporting film. The unit of thickness is "mm"]

Evaluation of Oxygen Permeability Coefficient-Reducing Capability of Oxygen Permeability Coefficient-Reducing Agent An oxygen permeability coefficient-reducing rate of the oxygen permeability coefficient-reducing agent used in each Example to the wavelength conversion layer contained in each wavelength conversion member can be calculated using the above-described equation from the oxygen permeability coefficient of each Example and the oxygen permeability coefficient of the Comparative Example in which the formulation of the quantum dot dispersion was the same except for the oxygen permeability coefficient-reducing agent. Specifically, the oxygen permeability coefficient-reducing rate with respect to each of Examples 1 to 6 was calculated from the value of each of Examples 1 to 6 shown in the following and the value of Comparative Example 1 shown in the following table. In the same way, the oxygen permeability coefficient-reducing rate with respect to Example 7 was calculated in comparison with Comparative Example 2, with respect to Example 8 was calculated in comparison with Comparative Example 3, with respect to Example 9 was calculated in comparison with Comparative Example 4, and with respect to Example 10 was calculated in comparison with Comparative Example 5. The results are shown in the following table.

As shown in the above tables, since the brightness change at the edge of the wavelength conversion members of Examples is smaller than the wavelength conversion members of Comparative Examples, it has been confirmed that the wavelength conversion members of Examples exhibit good light emission efficiency even after continuous irradiation with ultraviolet ray. From this fact, it can be confirmed that, in wavelength conversion members of Examples, the brightness reduction at the edge due to contamination of oxygen from the side surface of the wavelength conversion layer not protected by the barrier film can be suppressed.

An aspect of the present invention is useful in the production field of liquid crystal display devices.

The present disclosure relates to the subject matter contained in Japanese Patent Application No. 2014-103859 filed on May 19, 2014, Japanese Patent Application No. 2015-018846 filed on Feb. 2, 2015 and Japanese Patent Application No. 2015-98169 filed on May 13, 2015, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

TABLE 1

|  | Ex. 1 | Ex. 2 | Ex. 3 | Ex. 4 | Ex. 5 |
|---|---|---|---|---|---|
| Wavelength conversion member | Wavelength conversion member A | Wavelength conversion member B | Wavelength conversion member C | Wavelength conversion member D | Wavelength conversion member E |
| First and second films | Barrier film 10 | Barrier film 10 | Barrier film 10 | Barrier film 10 | Barrier film 10 |
| Oxygen permeability coefficient per 1 mm thickness [$cm^3/m^2/day/atm$] | 102.3 | 111.2 | 122.3 | 129.0 | 131.2 |
| Oxygen permeability coefficient-reducing rate [%] | 59 | 56 | 51 | 48 | 48 |
| Brightness change at edge (after/before continuous irradiation) | A | A | B | B | B |

|  | Ex. 6 | Comp. Ex. 1 | Ex. 7 | Comp. Ex. 2 | Ex. 8 |
|---|---|---|---|---|---|
| Wavelength conversion member | Wavelength conversion member F | Wavelength conversion member I | Wavelength conversion member G | Wavelength conversion member K | Wavelength conversion member H |
| First and second films | Barrier film 11 | Barrier film 10 | Barrier film 11 | Barrier film 11 | Barrier film 11 |
| Oxygen permeability coefficient per 1 mm thickness [$cm^3/m^2/day/atm$] | 102.3 | 250.0 | 102.3 | 250.0 | 120.1 |
| Oxygen permeability coefficient-reducing rate [%] | 59 | 0 | 59 | 0 | 48 |
| Brightness change at edge (after/before continuous irradiation) | A | D | A | D | A |

|  | Comp. Ex. 3 | Ex. 9 | Comp. Ex. 4 | Ex. 10 | Comp. Ex. 5 |
|---|---|---|---|---|---|
| Wavelength conversion member | Wavelength conversion member M | Wavelength conversion member J | Wavelength conversion member N | Wavelength conversion member L | Wavelength conversion member O |
| First and second films | Barrier film 11 | Barrier film 10 | Barrier film 10 | Barrier film 10 | Barrier film 10 |
| Oxygen permeability coefficient per 1 mm thickness [$cm^3/m^2/day/atm$] | 222.4 | 85.3 | 181.5 | 74.3 | 165.0 |
| Oxygen permeability coefficient-reducing rate [%] | 0 | 53 | 0 | 55 | 0 |
| Brightness change at edge (after/before continuous irradiation) | D | AA | C | AA | C |

What is claimed is:

1. A wavelength conversion member, which comprises a wavelength conversion layer, wherein
the wavelength conversion layer comprises at least one quantum dot which has a property of being excited with exciting light to emit fluorescence, and at least one oxygen permeability coefficient-reducing agent,
an oxygen permeability coefficient per 1 mm thickness of the wavelength conversion layer is less than 150.0 $cm^3/m^2/day/atm$,
the oxygen permeability coefficient-reducing agent is a compound which exhibits an oxygen permeability coefficient-reducing capability of reducing the oxygen permeability coefficient per 1 mm thickness of the wavelength conversion layer by equal to or more than 30% per 10 parts by weight of the oxygen permeability coefficient-reducing agent relative to 100 parts by weight of the wavelength conversion layer except for the oxygen permeability coefficient-reducing agent, and
wherein the wavelength conversion layer comprises the oxygen permeability coefficient-reducing agent in an amount of 1 to 50 parts by weight relative to 100 parts by weight of the wavelength conversion layer except for the oxygen permeability coefficient-reducing agent.

2. The wavelength conversion member according to claim 1, wherein the oxygen permeability coefficient-reducing agent is at least one compound selected from the group consisting of a biphenyl compound, a hydrogenated biphenyl compound, a terphenyl compound, a bisphenol compound, a hydrogenated bisphenol compound, a trityl compound, a hydrogenated trityl compound, a rosin compound, a novolac compound, a cardo compound, a benzophenone compound and a dialkyl ketone compound.

3. The wavelength conversion member according to claim 1, wherein the oxygen permeability coefficient-reducing agent is a biphenyl compound.

4. The wavelength conversion member according to claim 1, wherein the oxygen permeability coefficient-reducing agent is a bisphenol compound.

5. The wavelength conversion member according to claim 1, wherein the oxygen permeability coefficient-reducing agent is a cardo compound.

6. The wavelength conversion member according to claim 1, wherein the oxygen permeability coefficient-reducing agent is a compound having a molecular weight of equal to or less than 2000.

7. The wavelength conversion member according to claim 1, wherein the wavelength conversion layer is a cured layer that has been formed by curing a polymerizable composition comprising the quantum dot and the oxygen permeability coefficient-reducing agent, and at least one polymerizable compound selected from the group consisting of a monofunctional (meth)acrylate compound, a polyfunctional (meth)acrylate compound and an epoxy compound.

8. The wavelength conversion member according to claim 1, wherein the wavelength conversion layer has a thickness ranging from 1 μm to 500 μm.

9. The wavelength conversion member according to claim 1, wherein the quantum dot is at least one selected from the group consisting of:
a quantum dot A having an emission center wavelength within a wavelength range of 600 nm to 680 nm,
a quantum dot B having an emission center wavelength within a wavelength range of 500 nm to 600 nm, and
a quantum dot C having an emission center wavelength within a wavelength range of 400 nm to 500 nm.

10. The wavelength conversion member according to claim 1, which comprises at least one layer selected from the group consisting of an inorganic layer and an organic layer on at least one main surface of the wavelength conversion layer.

11. The wavelength conversion member according to claim 10, which comprises at least one layer selected from the group consisting of an inorganic layer and an organic layer on each of one main surface and the other main surface of the wavelength conversion layer.

12. A backlight unit, which comprises at least a light source and a wavelength conversion member, the wavelength conversion member comprising a wavelength conversion layer, wherein
the wavelength conversion layer comprises at least one quantum dot which has a property of being excited with exciting light to emit fluorescence, and at least one oxygen permeability coefficient-reducing agent,
an oxygen permeability coefficient per 1 mm thickness of the wavelength conversion layer is less than 150.0 $cm^3/m^2/day/atm$,
the oxygen permeability coefficient-reducing agent is a compound which exhibits an oxygen permeability coefficient-reducing capability of reducing the oxygen permeability coefficient per 1 mm thickness of the wavelength conversion layer by equal to or more than 30% per 10 parts by weight of the oxygen permeability coefficient-reducing agent relative to 100 parts by weight of the wavelength conversion layer except for the oxygen permeability coefficient-reducing agent, and
wherein the wavelength conversion layer comprises the oxygen permeability coefficient-reducing agent in an amount of 1 to 50 parts by weight relative to 100 parts by weight of the wavelength conversion layer except for the oxygen permeability coefficient-reducing agent.

13. The backlight unit according to claim 12, wherein the oxygen permeability coefficient-reducing agent is at least one compound selected from the group consisting of a biphenyl compound, a hydrogenated biphenyl compound, a terphenyl compound, a bisphenol compound, a hydrogenated bisphenol compound, a trityl compound, a hydrogenated trityl compound, a rosin compound, a novolac compound, a cardo compound, a benzophenone compound and a dialkyl ketone compound.

14. The backlight unit according to claim 12, wherein the oxygen permeability coefficient-reducing agent is a biphenyl compound.

15. The backlight unit according to claim 12, wherein the oxygen permeability coefficient-reducing agent is a bisphenol compound.

16. The backlight unit according to claim 12, wherein the oxygen permeability coefficient-reducing agent is a cardo compound.

17. The backlight unit according to claim 12, wherein the light source has an emission center wavelength within a wavelength range of 430 nm to 480 nm.

18. A liquid crystal display device, which comprises at least a liquid crystal cell and a backlight unit, wherein the backlight unit comprises at least a light source and a wavelength conversion member, the wavelength conversion member comprising a wavelength conversion layer, wherein
the wavelength conversion layer comprises at least one quantum dot which has a property of being excited with exciting light to emit fluorescence, and at least one oxygen permeability coefficient-reducing agent, an oxygen permeability coefficient per 1 mm thickness of the wavelength conversion layer is less than 150.0 $cm^3/m^2/day/atm$, the oxygen permeability coefficient-reducing agent is a compound which exhibits an oxygen permeability coefficient-reducing capability of reducing the oxygen permeability coefficient per 1 mm thickness of the wavelength conversion layer by equal to or more than 30% per 10 parts by weight of the oxygen permeability coefficient-reducing agent relative to 100 parts by weight of the wavelength conversion layer except for the oxygen permeability coefficient-reducing agent, and wherein the wavelength conversion layer comprises the oxygen permeability coefficient-reducing agent in an amount of 1 to 50 parts by weight relative to 100 parts by weight of the wavelength conversion layer except for the oxygen permeability coefficient-reducing agent.

19. The liquid crystal display device according to claim 18, wherein the oxygen permeability coefficient-reducing agent is at least one compound selected from the group consisting of a biphenyl compound, a hydrogenated biphenyl compound, a terphenyl compound, a bisphenol compound, a hydrogenated bisphenol compound, a trityl compound, a hydrogenated trityl compound, a rosin compound, a novolac compound, a cardo compound, a benzophenone compound and a dialkyl ketone compound.

* * * * *